(12) United States Patent
Laroia et al.

(10) Patent No.: US 8,570,972 B2
(45) Date of Patent: Oct. 29, 2013

(54) APPARATUS AND METHOD OF GENERATING AND MAINTAINING ORTHOGONAL CONNECTION IDENTIFICATIONS (CIDS) FOR WIRELESS NETWORKS

(75) Inventors: Rajiv Laroia, Far Hills, NJ (US); Junyi Li, Bedminster, NJ (US); Xinzhou Wu, Monmouth Junction, NJ (US); Saurabh Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1262 days.

(21) Appl. No.: 12/147,083

(22) Filed: Jun. 26, 2008

(65) Prior Publication Data

US 2009/0017801 A1 Jan. 15, 2009

Related U.S. Application Data

(60) Provisional application No. 60/948,882, filed on Jul. 10, 2007.

(51) Int. Cl.
*H04W 4/00* (2009.01)

(52) U.S. Cl.
USPC ........... 370/330; 370/252; 370/278; 370/329; 370/231; 455/414.1

(58) Field of Classification Search
USPC .................. 370/329, 331, 252, 278, 231, 330
See application file for complete search history.

(56) References Cited

U.S. PATENT DOCUMENTS

| | | | |
|---|---|---|---|
| 7,184,393 B1 | 2/2007 | Singh et al. | |
| 7,239,882 B1 | 7/2007 | Cook | |
| 8,134,931 B2 | 3/2012 | Laroia et al. | |
| 2004/0174829 A1 | 9/2004 | Ayyagari | |
| 2005/0117525 A1 | 6/2005 | Poustchi et al. | |
| 2005/0169219 A1* | 8/2005 | Serpa et al. | 370/338 |

(Continued)

FOREIGN PATENT DOCUMENTS

| | | |
|---|---|---|
| JP | 2008507219 T | 3/2008 |
| JP | 2009521846 | 6/2009 |

(Continued)

OTHER PUBLICATIONS

Taiwan Search Report—TW097126105—TIPO—Mar. 6, 2012.

(Continued)

*Primary Examiner* — David Q Nguyen

(74) *Attorney, Agent, or Firm* — Joseph B. Agusta

(57) ABSTRACT

A first device is configured to select and utilize a connection identifier (CID) for a peer-to-peer communication connection between the first device and a second device in a wireless communications network. The CID is selected from a predetermined set of a plurality of CIDs. Prior to selecting the connection identifier, the first device monitors a CID broadcast channel to determine whether the CID is being utilized by other nearby connections. If it is determined that the CID is being utilized by another connection in the proximity, a different (unused) CID is selected. A transmission request is transmitted to the second device using a first transmission resource unit within a traffic control channel slot, the first transmission resource unit being determined as a function of the selected CID. The first device transmits traffic data to the second device in a traffic channel slot corresponding to the traffic control channel slot.

43 Claims, 19 Drawing Sheets

(56) References Cited

U.S. PATENT DOCUMENTS

| | | |
|---|---|---|
| 2005/0286407 A1 | 12/2005 | Park et al. |
| 2007/0070943 A1 | 3/2007 | Livet et al. |
| 2007/0160083 A1 | 7/2007 | Un et al. |
| 2007/0225044 A1* | 9/2007 | Law et al. .................. 455/562.1 |
| 2009/0016219 A1 | 1/2009 | Laroia et al. |
| 2009/0019165 A1 | 1/2009 | Li et al. |

FOREIGN PATENT DOCUMENTS

| | | |
|---|---|---|
| TW | I278205 B | 4/2007 |
| WO | WO2006007946 A1 | 1/2006 |
| WO | WO2007075671 | 7/2007 |
| WO | WO2007082242 | 7/2007 |
| WO | WO2007082249 | 7/2007 |

OTHER PUBLICATIONS

International Search Report—PCT/US08/069073—International Search Authority, European Patent Office—Oct. 23, 2008.

Written Opinion—PCT/US08/069073—International Search Authority, European Patent Office—Oct. 23, 2008.

Zhang, Yanchao, et al., "Anonymous handshakes in mobile ad hoc networks," Military Communications Conference, 2004 IEEE Monterey, CA, Oct. 31-Nov. 3, 2004, vol. 3, Oct. 31, 2004, pp. 1193-1199.

Chakravarthy V., et al., "TDCS, OFDM, and MC-CDMA: A brief tutorial," IEEE Communications Magazine, IEEE Service Center, Piscataway, US, vol. 43, No. 9, Sep. 1, 2005, pp. S11-S16.

* cited by examiner

APPARATUS AND METHOD OF GENERATING AND MAINTAINING ORTHOGONAL CONNECTION IDENTIFICATIONS (CIDS) FOR WIRELESS NETWORKS

CLAIM OF PRIORITY UNDER 35 U.S.C. §119

The present Application for patent claims priority to U.S. Provisional Application No. 60/948,882 entitled "Apparatus and Method of Generating and Maintaining Orthogonal Transmission Identifications (CIDs) for Wireless Networks" filed Jul. 10, 2007, and assigned to the assignee hereof and hereby expressly incorporated by reference herein.

BACKGROUND

1. Field

The following description generally relates to wireless communications and, in particular, generating and maintaining orthogonal transmission CIDs in a wireless network where both ad hoc and local access point (AP) communications coexist.

2. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Wireless communication systems leverage various portions of wireless spectrum for transferring data. However, wireless spectrum is an expensive and valuable resource. For example, significant costs may be incurred by a company desiring to operate a wireless communication system over a portion of the wireless spectrum (e.g., within the licensed spectrum). Further, conventional techniques typically provide inefficient utilization of wireless spectrum. According to a common illustration, the spectrum allocated for wide area network cellular communication oftentimes is not uniformly utilized across time and space; thus a significant subset of spectrum may be unused in a given geographic location in a given time interval.

According to another example, wireless communication systems often times employ peer-to-peer or ad hoc architectures whereby a wireless terminal may transfer signals directly to another wireless terminal. As such, signals need not traverse through a base station; rather, wireless terminals within range of each other may discover and/or communicate directly. However, conventional peer-to-peer networks typically operate in an asynchronous manner whereby peers may effectuate differing tasks at a particular time. Consequently, peers may encounter difficulty associated with identifying and/or communicating with disparate peers within range, power may be inefficiently utilized, and so forth.

Therefore, a way is needed to allocate and or maintain peer identifiers within peer-to-peer communication networks that utilize a share frequency spectrum.

SUMMARY

The following presents a simplified summary of one or more embodiments in order to provide a basic understanding of some embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In an adhoc peer-to-peer communication network between wireless devices, an orthogonal connection identifier selection scheme is implemented to minimize interference between nearby wireless devices that concurrently use a shared frequency spectrum. In this orthogonal connection identifier scheme, a peer-to-peer connection avoids connection identifiers being used by other connections in its proximity.

A first device is configured to maintain a connection identifier for a peer-to-peer communication connection between the first device and a second device in a wireless communications network. The first device sends a first connection identifier broadcast signal corresponding to the connection identifier in a connection identifier broadcast channel. The first device then monitors the connection identifier broadcast channel to determine whether a second connection identifier broadcast signal corresponding to the connection identifier is received from the second device. If the first device determines that the second connection identifier broadcast signal is not received, it may conclude or determine that the second device is absent or out of range.

The connection identifier broadcast channel may include a plurality of symbols in a time interval. Prior to sending the first connection identifier broadcast signal, the first device may select a first one of the plurality of symbols of the connection identifier broadcast channel in the time interval to send the first connection identifier broadcast signal. The first device may also select a second one of the plurality of symbols to receive the second connection identifier broadcast signal. The first and second selected symbols may be selected as a function of the connection identifier. The selection of the first and second symbols may be determined by the first and second devices. Each of the plurality of symbols may be an OFDM symbol including a plurality of tones. The first connection identifier broadcast signal may be sent by the first device in one of the plurality of tones in the first selected symbol, and the second connection identifier broadcast signal may be received in one of the plurality of tones in the second selected symbol. The combinations of selected OFDM symbols and tones of the first and the second connection identifier broadcast signals may be determined as a function of the connection identifier, where different connection identifiers correspond to different combinations of selected OFDM symbols and tones. In one example, the first and the second selected OFDM symbols may be at least one OFDM symbol apart.

The connection identifier broadcast channel may include at least a first and a second predetermined subsets of OFDM symbols. The first selected OFDM symbol in which the first connection identifier broadcast signal is sent may belong to the first subset. The second selected OFDM symbol in which the second connection identifier broadcast signal is received may belong to the second subset. The partition of the first and second subsets may be independent of any connection identifier.

If a selected connection identifier is determined to be in use by another connection, the first device may be configured to drop the connection with the second device and restrains from sending connection identifier broadcast signals corresponding to the connection identifier in the connection identifier broadcast channel.

The connection identifier broadcast channel may be part of a frequency spectrum shared with a plurality of other peer-to-peer connections.

The various features describe herein may be implemented within a wireless device, a circuit or processor incorporated in a wireless device, and/or a software.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
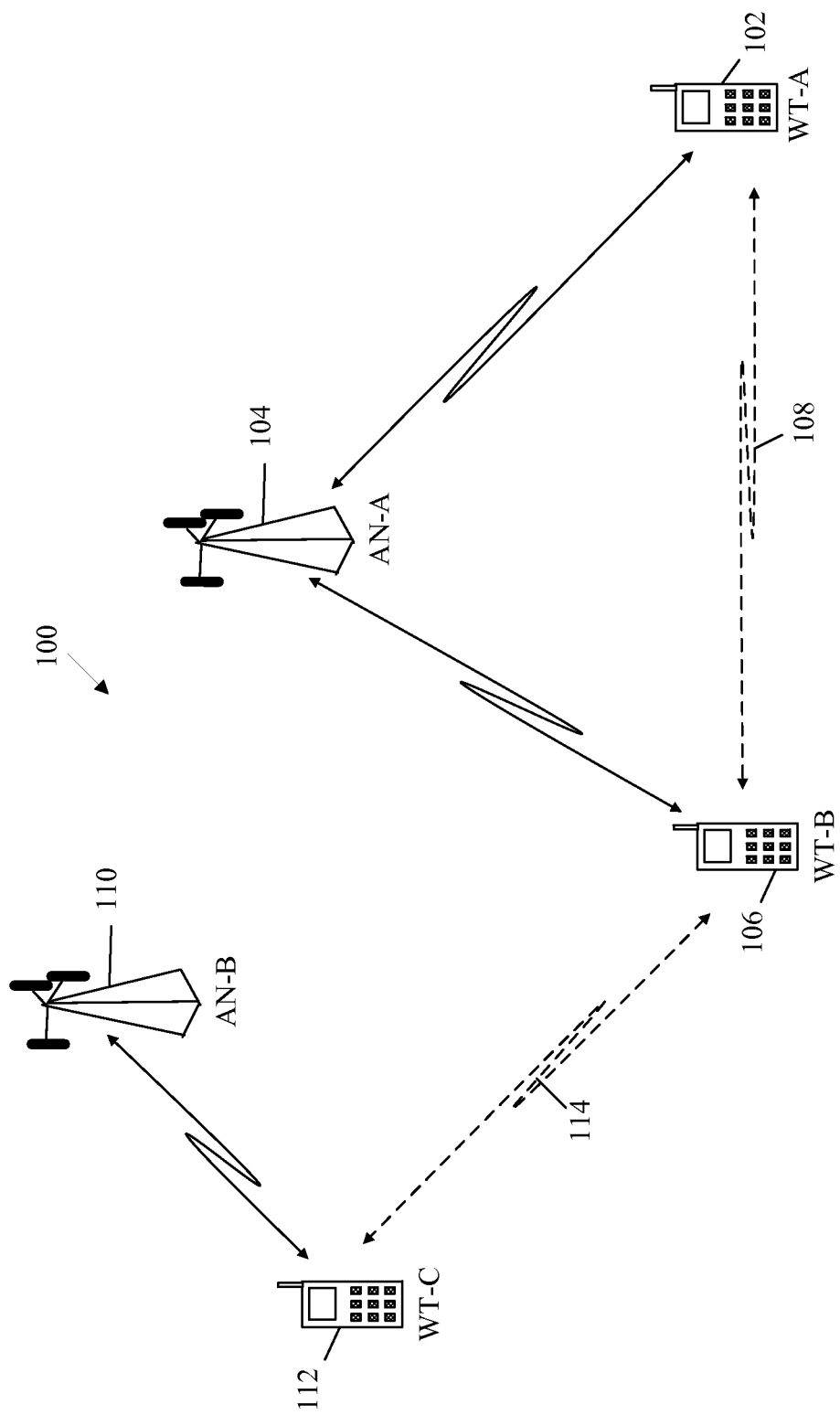
FIG. 1 is a block diagram illustrating the how an ad hoc peer-to-peer network may be implemented in conjunction with a wide area network.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In one embodiment, there is disclosed an apparatus and method of generating a transmission connection identifier (CID) for a transmitter/receiver pair in a wireless network comprising generating an orthogonal transmission CID for the transmitter/receiver pair, and signaling a transmission intention of the transmitter. This embodiment generates transmission connection CIDs which are not likely to collide into each other in a two-hop neighborhood. When a transmitter wants to start a conversation with a certain neighboring node, it first grabs a deterministic transmission CID which is not used in its neighborhood. This can be done by using a CID broadcast period, which for example is made the same as a paging period where the mobiles may ping each other to start the conversation. Right after the paging period, the current users broadcast the transmission CIDs in use in the CID broadcast period and the new transmitter/receiver pair listen in this period. The transmitter/receiver then exchange the CIDs they see in the transmission CID determination period they see in the CID broadcast period and jointly choose an unused CID.

In another embodiment, a wireless terminal is configured to operate as a transmitter/receiver in a wireless network, comprising means for detecting an orthogonal transmission CID for the transmitter/receiver pair, and means for signaling a transmission intention of the transmitter. The wireless terminal may further comprise means for listening for transmission CIDs during a transmission CID determination period, and means for choosing an unused transmission CID for the transmitter/receiver pair.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

Ad Hoc Communication System

An ad hoc peer-to-peer wireless network may be established among two or more terminals without intervention of a centralized network controller. In some examples, the wireless network may operate within a frequency spectrum shared among a plurality of wireless terminals.

FIG. 1 is a block diagram illustrating the how an ad hoc peer-to-peer network may be implemented, e.g., in conjunction a wide area network. In some examples, the peer-to-peer network and the wide area network may share the same frequency spectrum. In other examples, the peer-to-peer network is operated at a different frequency spectrum, e.g., a spectrum dedicated to the use of the peer-to-peer network. A communication system 100 may comprise one or more wireless terminals WT-A 102, WT-B 106, and WT-C 112. Although just three wireless terminals WT-A 102, WT-B 106, and WT-C 112 are depicted, it is to be appreciated that communication system 100 may include any number of wireless terminals. The wireless terminals WT-A 102, WT-B 106, and WT-C 112 can be, for example, cellular phones, smart phones, laptops, handheld communication devices, handheld computing devices, satellite radios, global positioning systems, PDAs, and/or any other suitable device for communicating over wireless communication system 100.

According to one example, the communication system 100 may support a wide area network (WAN) which may include one or more access nodes AN-A 104 and AN-B 110 (e.g., base station, access point, etc.) and/or any number of disparate access nodes (not shown) in one or more sectors/cells/regions that receive, transmit, repeat, etc., wireless communication signals to each other and/or to the one or more wireless terminals WT-A 102, WT-B 106, and WT-C 112. Each access node AN-A 104 and AN-B 110 may comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. According to an optional feature, when communicating through the WAN, the wireless terminal(s) may transmit signals to and/or receive signals from an access node when communicating via the wide area infra-structure network supported by the communication system 100. For instance, wireless terminals WT-A 102 and WT-B 106 may communicate with the network via access node AN-A 104 while wireless terminal WT-C 112 may communication with a different access node AN-B 110.

The wireless terminals may also communicate directly with each other via a local area peer-to-peer (P2P) network (e.g., ad hoc network). Peer-to-peer communications may be effectuated by directly transferring signals between wireless terminals. Thus, the signals need not traverse through an access node (e.g., a base station) or centrally managed network. The peer-to-peer network may provide short range, high data rate communication (e.g., within a home, office, etc. type setting). For example, wireless terminals WT-A 102 and WT-B 106 may establish a first peer-to-peer network 108 and wireless terminals WT-B 106 and WT-C 112 may also establish a second peer-to-peer network 114.

Additionally, each peer-to-peer network connection 108 and 114 may include wireless terminals within a similar geographic area (e.g., within range of one another). However, it is to be appreciated that wireless terminals need not be associated with the same sector and/or cell to be included in a common peer-to-peer network. Further, peer-to-peer networks may overlap such that one peer-to-peer network may take place within a region that overlaps or is encompassed with another larger peer-to-peer network. Additionally, a wireless terminal may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Peer-to-peer communications between the wireless terminals may be synchronous. For example, wireless terminals WT-A 102 and WT-B 106 may utilize a common clock reference to synchronize performance of distinct functions. The wireless terminals WT-A 102 and WT-B 106 may obtain timing signals from the access node AN-A 104. The wireless terminals WT-A 102 and WT-B 106 may also obtain timing signals from other sources, for instance, GPS satellites or television broadcast stations. According to an example, time may be meaningfully partitioned in a peer-to-peer network for functions such as peer discovery, paging, and traffic. Further, it is contemplated that each peer-to-peer network may set its own time.

Before communication of traffic in a peer-to-peer connection can take place, the two peer wireless terminals may detect and identity each other. The process by which this mutual detection and identification between peers takes place may be referred to as peer discovery. The communication system 100 may support peer discovery by providing that peers, desiring to establish peer-to-peer communications, periodically transmit short messages and listen to the transmissions of others. For example, the wireless terminals WT-A 102 (e.g., transmitting wireless terminal) may periodically broadcast or send signals to the other wireless terminal(s) WT-B 106 (e.g., receiving wireless terminal(s)). This allows the receiving wireless terminal WT-B 106 to identify the sending wireless terminal WT-A 102 when the receiving wireless terminal WT-B 106 is in vicinity of the sending wireless terminal WT-A 102. After identification, an active peer-to-peer connection 108 may be established.

Transmissions for peer discovery may periodically occur during specified times referred to as peer discovery intervals, the timing of which may be predetermined by a protocol and known to the wireless terminals WT-A 102 and WT-B 106. Wireless terminals WT-A 102 and WT-B 106 may each transmit respective signals to identify themselves. For example, each wireless terminal WT-A 102 and WT-B 106 may send a signal during a portion of a peer discovery interval. Further, each wireless terminal WT-A 102 and WT-B 106 may monitor signals potentially transmitted by other wireless terminals in a remainder of the peer discovery interval. According to an example, the signal may be a beacon signal. By way of another illustration, the peer discovery interval may include a number of symbols (e.g., OFDM symbols). Each wireless terminal WT-A 102 may select at least one symbol in the peer discovery interval for transmission by that wireless terminal WT-A 102. Moreover, each wireless terminal WT-A 102 may transmit a corresponding signal in one tone in the symbol selected by that wireless terminal WT-A 102.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

After wireless terminals discover each other, they may proceed to establish connections. In some examples, a connection links two wireless terminals, e.g., in FIG. 1 connection 108 links wireless terminals WT-A and WT-B. Terminal WT-A 102 can then transmit traffic to terminal WT-B 106 using connection 108. Terminal WT-B 106 can also transmit traffic to terminal WT-A 102 using connection 108.

Figure 2:
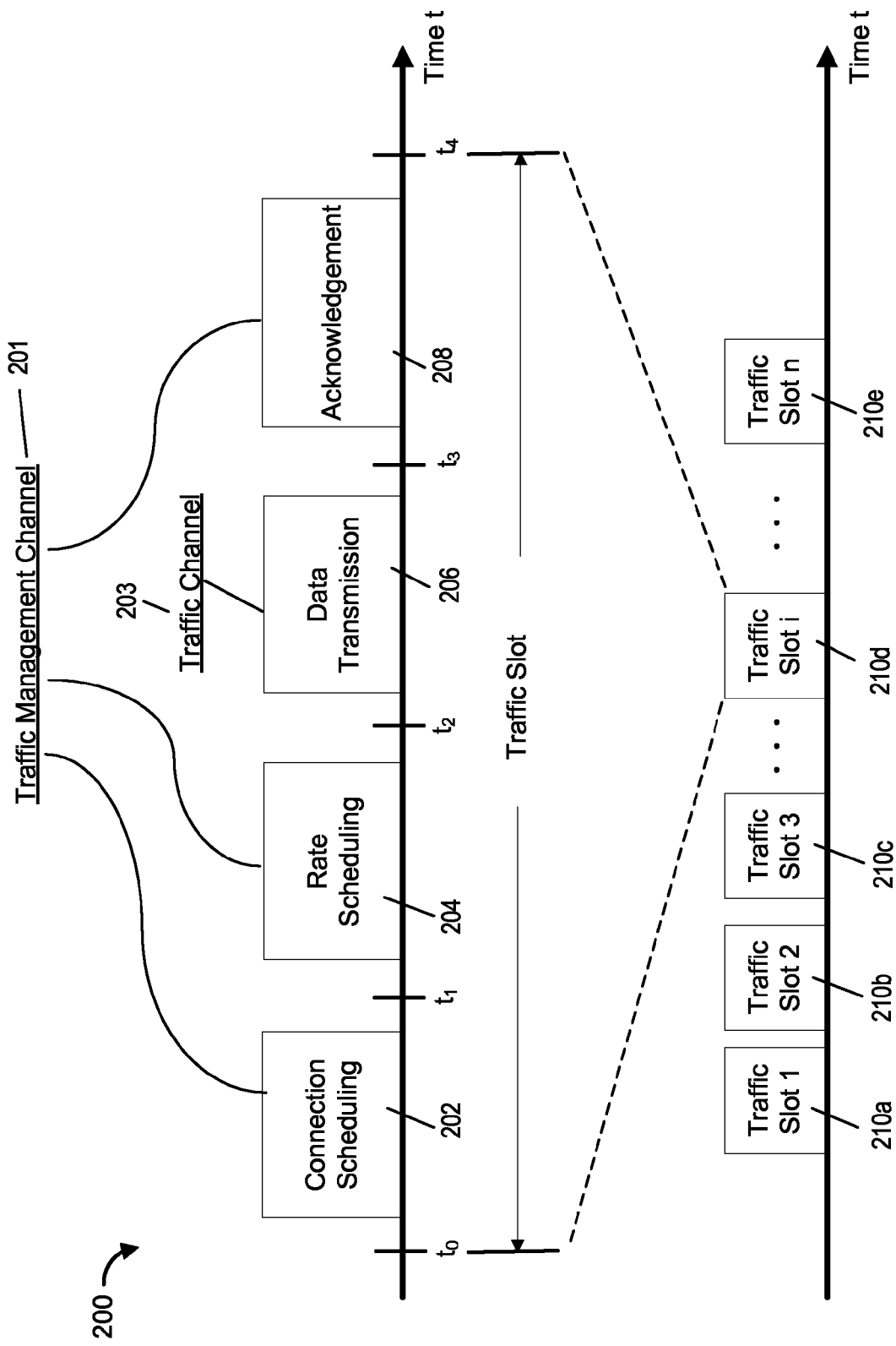
FIG. 2 illustrates one example of a timing sequence for a traffic channel slot that may be used by wireless terminals to transport traffic after a peer-to-peer communication connection has been established between wireless terminals.

FIG. 2 illustrates one example of a timing sequence for a traffic channel slot that may be used by wireless terminals to transport traffic after a peer-to-peer communication connection has been established between wireless terminals. Each traffic channel slot 210 may include a traffic management channel 201 and a traffic channel 203. The traffic management channel 201 may be used for signaling related to traffic data transmissions in the traffic channel 206. A connection scheduling segment 202, a rate scheduling segment 204, and an acknowledgment segment 208 are collectively referred to as the traffic management channel 201. A data transmission segment 206 may be referred to as the traffic channel 203. The connection scheduling segment 202, the rate scheduling segment 204, the data segment 206 and the acknowledgment 208 shown in FIG. 2 comprise a traffic slot.

The connection scheduling segment 202 may be used by a transmitter terminal to indicate to its receiver terminal (in a peer-to-peer connection) to indicate that it is ready to transmit traffic data. The rate scheduling segment 204 allows the transmitter/receiver terminals (in the peer-to-peer connection) to obtain a transmission rate and/or power to use in transmitting the traffic data. The data transmission segment 206 is then used to transmit the desired traffic data at the obtained transmission rate and/or power. The acknowledgement segment 208 may be used by the receiver terminal to indicate that the traffic data was received or not received in the data transmission segment 206. In one example, the time duration of a traffic slot is approximately two (2) milliseconds. As the traffic slots 210 repeat over time, the time sequence structure shown in FIG. 2 shows one period of the traffic slots. Note that, prior to sending traffic data in the traffic slot 210, the transmitter and receiver terminals may have established a peer-to-peer connection via a control slot 404 (in FIG. 4).

Collision Mitigation Using Transmission CIDs

In an ad hoc peer-to-peer communication system, multiple communications may take place using frequency spectrum resources shared in both space and time. Because of the distributed nature of the ad hoc peer-to-peer network, it may not always be possible to control the channel allocations (e.g., slots) used for transmissions between the wireless terminals. In wireless networks where a central authority does not exist, interference avoidance and/or management is a key feature to maintain the efficiency of the network performance.

Figure 3:
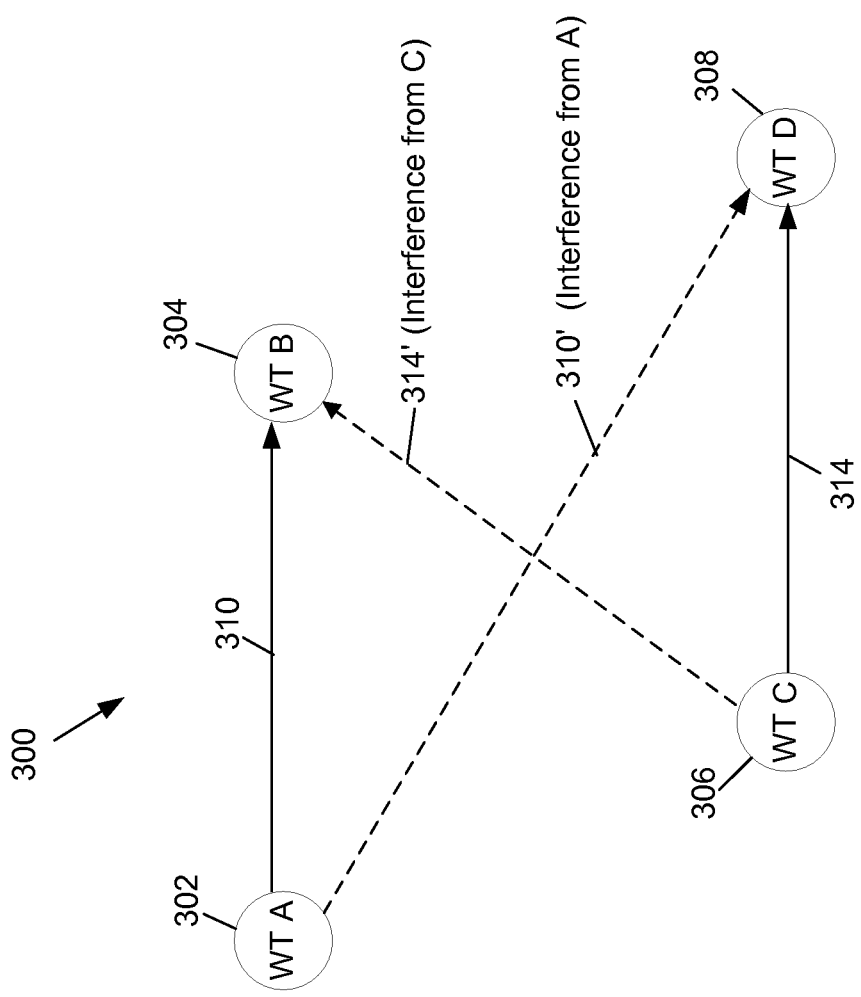
FIG. 3 is a block diagram illustrating an environment in which a plurality of wireless terminals may establish peer-to-peer communication connections that may cause interference to other nearby wireless terminals.

FIG. 3 is a block diagram illustrating an environment in which a plurality of wireless terminals may establish peer-to-peer communication connections that may cause interference to other nearby wireless terminals. A peer-to-peer network 300 may include a plurality of wireless terminals that may share and/or concurrently use a frequency spectrum. The shared frequency spectrum may include one or more transmission and/or control channels, with each transmission (traffic) channel having a corresponding traffic management channel. In one example, the traffic management channel may be used to send a traffic request for communications over a corresponding transmission (traffic) channel.

In one example, a first wireless terminal WT A 302 may be attempting to transmit 310 to a second wireless terminal WT B 304 while a third wireless terminal WT C 306 is concurrently attempting to transmit 314 to a fourth wireless terminal WT D 308 using the same traffic channel bandwidth resource. The first wireless terminal WT A 302 may be referred to as the intended transmitter, the second wireless terminal WT B 304 may be referred to as the intended receiver, and the third wireless terminal WT C 306 may be considered the interferer. In this peer-to-peer network 300, a transmission and control channel pair may be shared by the plurality of the wireless terminals WT A, WT B, WT C, and WT D. However, because such transmission (traffic) and/or control channel is shared (e.g., frequency spectrum sharing) by the wireless terminals, it may also result in unwanted interference 314' and 310' among the wireless terminals. For instance, if both transmissions 310 and 314 actually take place, then the signal 314' from the third wireless terminal WT C 306 may be seen as interference to the second wireless terminal WT B 304 receiver and may degrade its ability to successfully recover the desired signal 310 from the first wireless terminal WT A 302. Therefore, certain interference management protocol is needed to manage interference from the third wireless terminal WT C 306 to the second wireless terminal WT B 304. One goal of the interference management protocol is to allow the third wireless terminal WT C 306 to transmit without creating excessive interference to the second wireless terminal WT B 304, thereby increasing the overall throughput and improving the system performance. Note that in the meantime, the first wireless terminal WT A 302 may also cause interference 310' to the fourth wireless terminal WT D 308, and a similar interference management protocol may also be used to control that interference.

Because there is no centralized traffic management authority, there is a chance that WT A 302 and WT C 306 may transmit on the same or overlapping channel, thereby causing interference with each other. For example, by coincidence, both WT A 302 and WT C 306 may use the same transmission CID. A transmission CID may be used to indicate a particular transmission channel (e.g., frequency or time slot) to a receiving terminal WT B 304 and 308. Consequently, when the same transmission CID is used by two terminals, they may also be concurrently transmitting on the same channel or overlapping channels. If both transmitting terminals WT A 302 and WT C 306 are within range of the receiver terminals WT B 304 and/or WT D 308, then the receiver terminals WT B 304 and/or WT D 308 may perceive interference.

In particular, a way is needed that allows multiple wireless terminals to choose channels within shared frequency the without distinguish between transmissions from an intended peer and those from an unintended peer.

Channel Architecture

Figure 4:
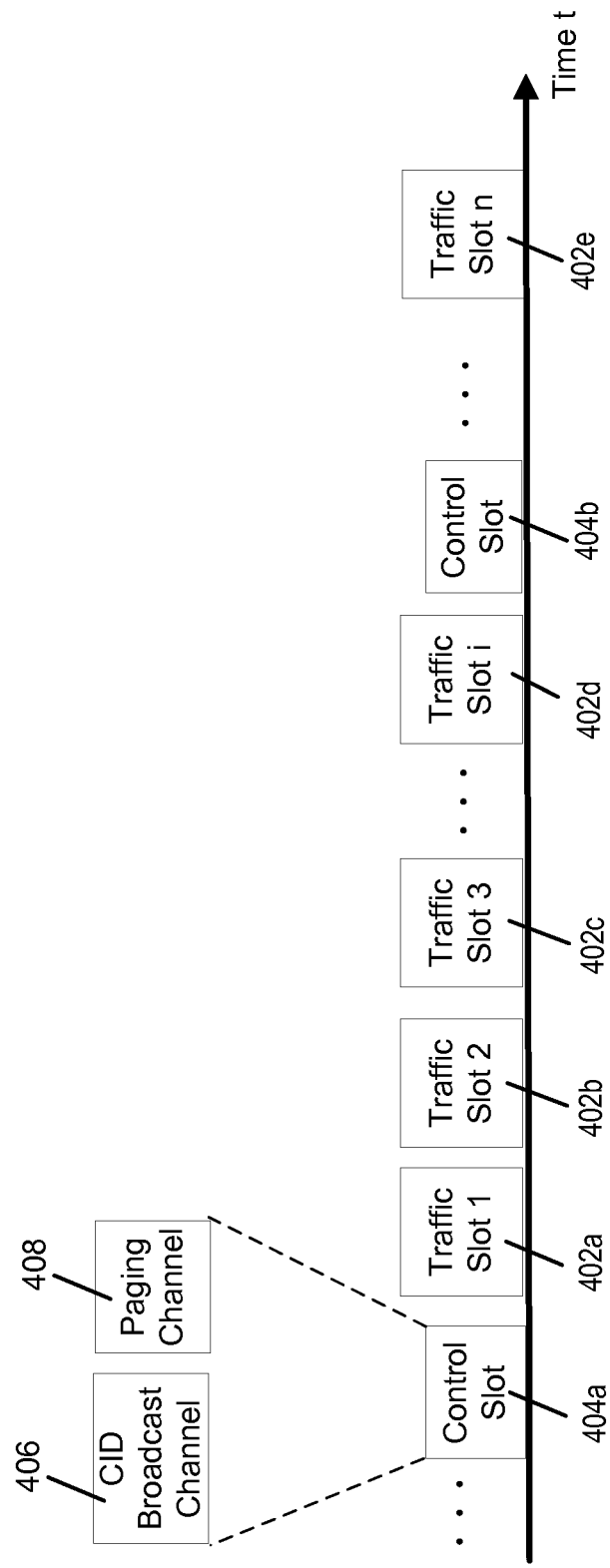
FIG. 4 illustrates one example of a channel architecture in which a control slot in inserted every so often between traffic slots.

FIG. 4 illustrates one example of a channel architecture in which a control slot in inserted every so often between traffic slots. Traffic slots 402 are time intervals during which a transmitter terminal may send peer-to-peer traffic data to a receiver terminal through the transmission channel. In one example, each traffic slot 402 may be as illustrated in FIG. 2. Each traffic slot may be 2 milliseconds (ms) long. A traffic slot 402 may include a traffic channel portion in which data traffic is transmitted and a traffic management channel portion in which scheduling and interference management takes place.

Each control slot 404 may include a CID Broadcast Channel 406 and a Paging Channel 408. The control slot 404 may occur at much longer intervals than traffic slots. For instance, the control slot 404 may occur every second or so. A control slot 404 may serve to establish and maintain a peer-to-peer connection between the transmitter and receiver terminals. The CID Broadcast Channel 406 may be used to indicate those peer-to-peer connection identifiers (CIDs) that are in use by nearby connections and to indicate whether a peer-to-peer connection is still alive. For example, the transmitter and receiver terminals may monitor the CID Broadcast Channel 406 to determine which CIDs are in use. The Paging Channel 408 is used by the transmitter and receiver terminals to establish new CIDs for a new peer-to-peer connection and may include a Paging Request Channel and a Paging Response Channel. The control slots 404 may occur at much longer intervals than traffic slots 402. For instance, the control slots 404 may occur every second or so.

Figure 5:
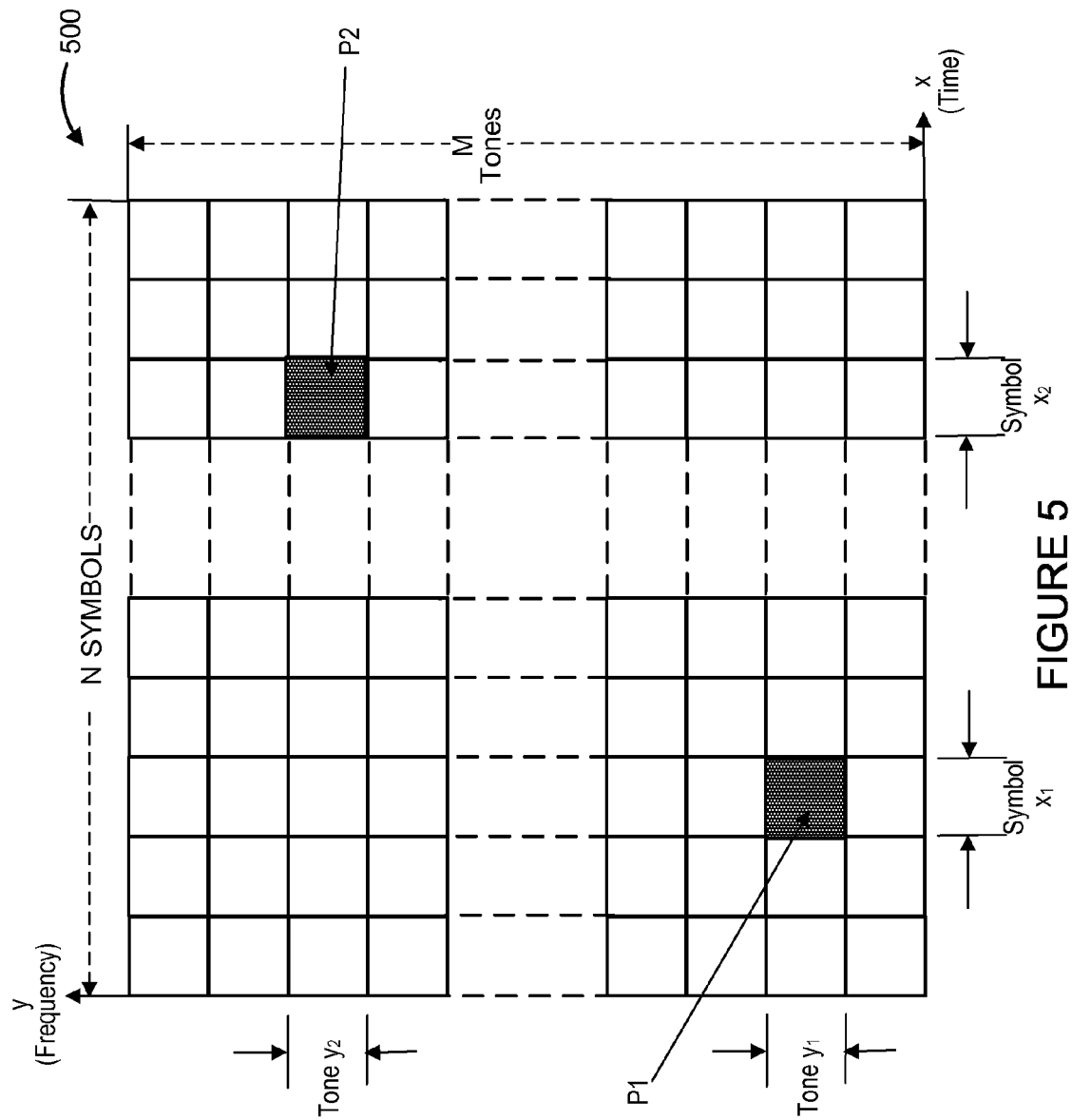
FIG. 5 illustrates an example time-frequency (grid) resource available for transmitting and/or receiving signals over a peer-to-peer network during a control or traffic channel interval.

FIG. 5 illustrates an example time-frequency grid 500 associated with a signal transmission. The exemplary signal may be an OFDM signal. The time-frequency grid 500 is the resource available for transmitting and/or receiving signals over a peer-to-peer network, e.g., during a control slot (e.g., control slot 404 in FIG. 4) and/or traffic channel slot (traffic slot 210 in FIG. 2 within traffic management channel 201). The x-axis represents time and may include N symbols (e.g., where N may be any integer), and the y-axis represents frequency and may include M tones (e.g., where M may be any integer).

A transmitter and/or receiver terminal may use the time-frequency grid 500 in the traffic management channel. For instance, the time-frequency grid may be considered a CID resource space from which a terminal may select a CID resource unit corresponding to a CID. For example, in a traffic slot, a transmitter terminal may select a CID resource unit to signal a transmission request to the corresponding receiver terminal of the connection associated with the CID. Similarly, the receiver terminal may select a CID resource unit to signal a request response to the transmitter terminal. The CID resource units available for the transmitter terminal and for the receiver terminal may be partitioned a priori in a fixed manner so that the transmitter terminal selects a CID resource unit in a fixed subset of the total time-frequency grid of the traffic management channel, while the receiver terminal selects a CID resource unit in a different fixed subset of the total time-frequency grid of the traffic management channel. Such CID resource space may be transmitted, for example, in a control slot 404 (in FIG. 4) and/or traffic slot 210 (in FIG. 2 within traffic management channel 201).

A CID resource unit may be defined by a time-frequency combination or symbol-tone combination. According to an example, in a control slot or a traffic management portion of a traffic slot, a terminal may select a particular symbol (e.g., transmission time) for transmission based upon an identifier of the wireless terminal or a user who is utilizing the wireless terminal and/or a time variable (e.g., time counter) that may be commonly understood within a peer-to-peer network to identify the current slot interval. Further, a particular tone corresponding to the selected symbol may be determined (e.g., based upon the identifier and/or time variable). Pursuant to a further example, a hash function of the identifier and the time variable may yield the selected symbol position and/or tone position. For example, for a given connection, when the time variable takes a first value, the hash function may yield symbol $x_1$ and tone $y_1$ such that the wireless terminal transmits a single-tone signal $P_1$ as shown in FIG. 5 as the CID resource unit. When the time variable takes a second value, the hash function may yield symbol $x_2$ and tone $y_2$ such that the wireless terminal transmits a single-tone signal $P_2$ as shown in FIG. 5 as the CID resource unit.

Collision Avoidance Using Orthogonal Transmission CIDs

One feature provides for generating transmission CIDs which are not likely to collide with each other in a two-hop neighborhood. Interference mitigation may be facilitated by generating and maintaining an orthogonal set of transmission CIDs where each Tx/Rx terminal pair chooses a transmission or connection CID which is not used by others in its neighborhood so as to make it less likely of the possibility of collisions. That is, this feature of generating and maintaining an orthogonal set of transmission CIDs makes it less likely for two or more Tx/Rx terminal pairs to accidentally choose the same transmission CID. This is because if two Tx/Rx terminal pairs accidentally chose the same CID and the two Tx/Rx terminal pairs are within the reach of each other, then it would bring confusion to both Tx/Rx terminal pairs and other neighboring terminals, e.g., when the terminals carry out the operation of interference management using the traffic control channel. This problem may become more severe when AR/AT communications are present in the system together with the ad hoc communication pairs.

When a transmitter terminal wants to initiate communications with a certain neighboring receiver terminal, it first selects one or more transmission CIDs which are not used in its neighborhood. In a synchronous wireless network, this can be achieved by introducing a CID broadcast period 604 in a slow time scale, e.g., once every second. In general, it makes sense to make the CID broadcast period the same as the paging period 603, where terminals ping each other to start the conversation.

As used herein, the term "orthogonal" refers to CIDs that are selected so as to ensure that others are not currently using the same CID. Such orthogonal CID may be achieved by first checking the CIDs that are in use by other connections (e.g., by monitoring a CID broadcast channel), selecting a CID that is unused or available, and switching CIDs if a collision is detected.

Figure 6:
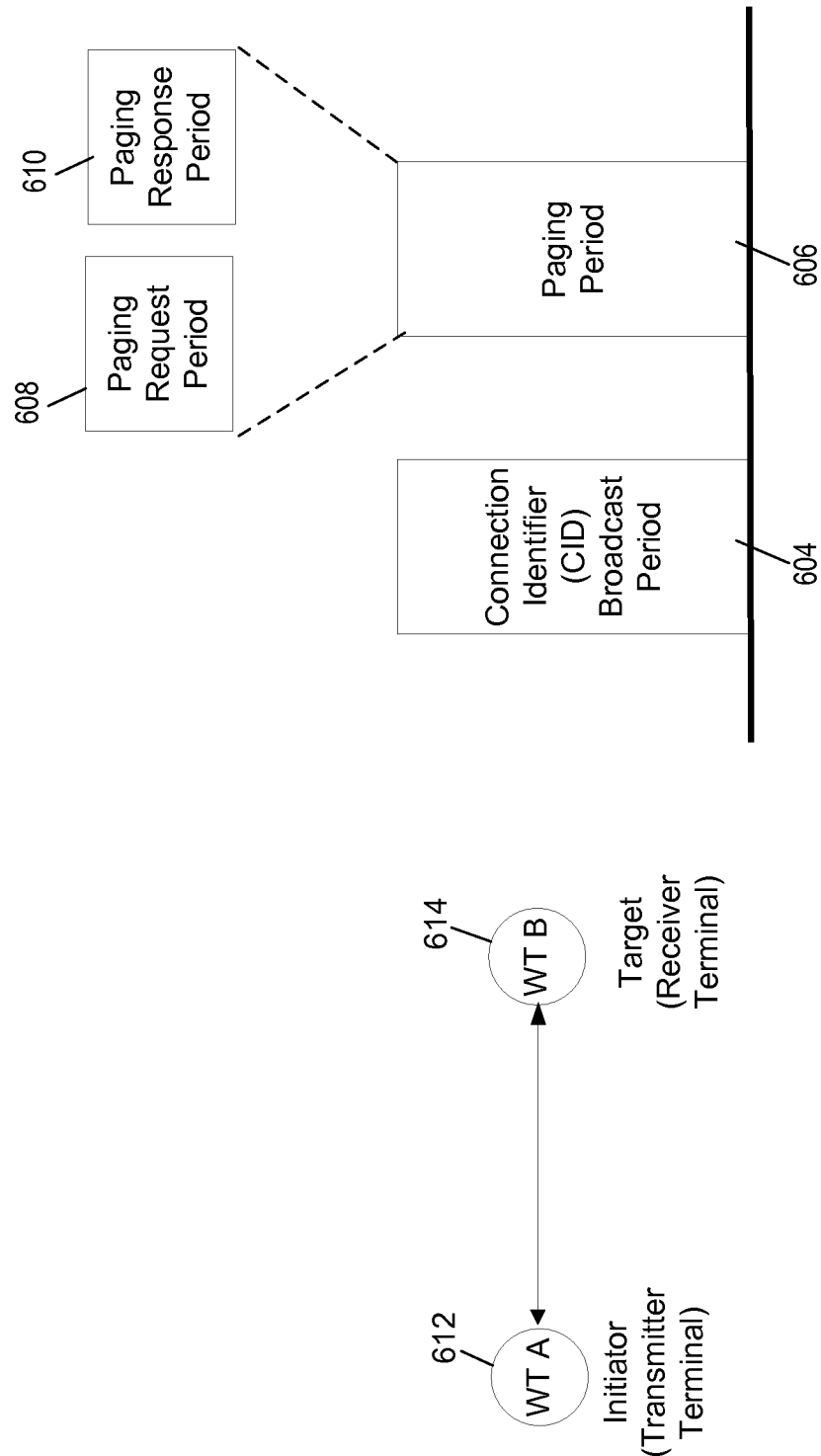
FIG. 6 illustrates one example of a timing sequence for a CID broadcast including a CID broadcast period and a paging period.

FIG. 6 illustrates one example of a timing sequence for a CID broadcast including a CID broadcast period 604, and a paging period 606. In the CID broadcast period 604, a terminal that has already had a CID broadcasts its CID so that other terminals in the vicinity become aware that the particular CID has been occupied. After the CID broadcast period 604, a paging period 606 occurs. The paging period 606 may include a paging request period 608 and a paging response period 610. A paging initiator 612 (e.g., transmitter terminal WT A) sends a paging request to the paging target 614 (e.g., receiver terminal WT B) in the paging request period 608. The paging target 614 then sends a paging response back to the paging initiator 612 in the paging response period 610. One purpose of the paging request and response exchange is to establish a connection between the paging initiator 612 and paging target 614. The paging initiator and target select a connection ID (CID) to be used by the two terminals in the subsequent traffic slots for exchanging other control and/or data traffic. To avoid interference and/or CID collisions with other neighboring connections, it is preferable that the CID selected by the paging initiator 612 and target 614 is not currently occupied or used by other terminals.

Therefore, the paging initiator and the paging target monitor the CID broadcast period 604 in order to detect which CIDs are not occupied in the vicinity. Note that a CID may be reused by different connections in geographic locations remote from each other, i.e., spatial reuse. To determine whether a CID is occupied or not, the paging initiator 612 and/or target 614 may monitor the signal corresponding to the CID in the CID broadcast period 604 and measure the signal strength. The paging initiator 612 and/or target 614 may compare the signal strength with a threshold. The value of the threshold may be fixed, or determined as a function of a measurement of the background noise. Alternatively, the paging initiator and/or target may compare the strength of the signal corresponding to the CID with the strength of the signals corresponding to other CIDs.

Note that the paging initiator 612 and the target 614 may independently monitor the CID broadcast period 604 and determine which CIDs are not occupied in the vicinity.

Because the radio frequency (RF) condition may be different at the paging initiator and the target, the list of available CIDs determined by the initiator or the target may be different. In one embodiment, the paging initiator 612 may determine one or more available CIDs based on its measurement during the CID broadcast period 604 and sends a list of available CIDs to the target in the paging request period 608. The paging target 614 may determine one or more available CIDs based on its measurement during the CID broadcast period 604, compare them with the list received in the paging request period 608, and select one CID out of the list from the paging initiator 612 to use. The selected CID is desirably the one that both the paging initiator 612 and target 614 consider to be available. The paging target 614 then informs the initiator 612 the selected CID in the paging response period 610.

Whether or not a CID is considered available (i.e., not occupied) is based on signal strength measurement in the CID broadcast period 604. The initiator 612 and/or target 614 may associate each available CID with some quality indicator, which indicates the extent to which the initiator 612 or target 614 considers the CID available. For example, if the received signal strength corresponding to a first CID is less than that of a second CID, then the initiator 612 or target 614 may determine that the first CID is "more" available than the second CID, which is reflected in the quality indictors associated with the first and the second CIDs. Furthermore, the initiator 612 may rank the available CIDs according to the associated quality indicator, and accordingly determine the list to send to the target 614. The initiator 612 may also include the quality indicator in the paging request message (sent in during the paging request period 608).

In the case where the available CIDs proposed by the initiator 612 are all considered "occupied" by the target 614, rather than select one out of the list from the initiator (transmitter terminal), the target 614 may further propose other CIDs to be used. A few iterations may take place between the initiator and the target (transmitter and receiver terminals) before the two terminals converge on the particular CID to be used.

It is appreciated that there are multiple ways of designing the CID broadcast period 604 since this happens in a slow time scale and the overhead is of less a constraint.

Figure 7:
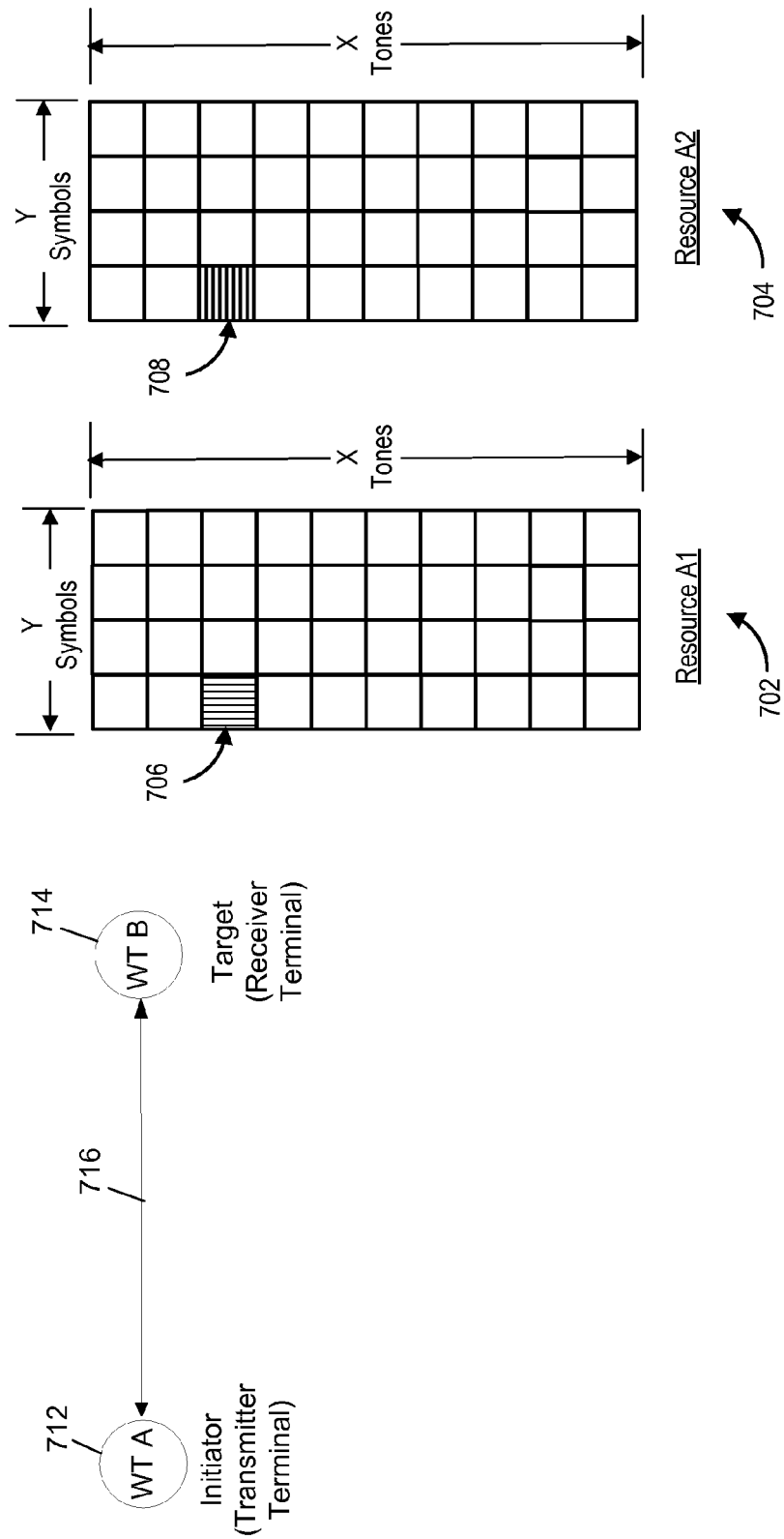
FIG. 7 illustrates one example of a two-part CID broadcast structure where each part covers the whole transmission CID space.

FIG. 7 illustrates one example of a two-part CID broadcast structure where each part covers the whole transmission CID space. For example, assuming the transmission CID space spans from 1 to N, each CID broadcast resource A1 702 and A2 704 in FIG. 7 may have N degrees of freedom. For example, each of A1 and A2 may include X tones in Y OFDM symbols, where N=X*Y. Suppose that a first and second terminals 712 and 714 are associated with a connection 716 that has already had a CID. Suppose that the connection 716 was established when the first terminal 712 pages the second terminal 714. That is, between the first and the second terminals 712 and 714, it is understood that the first terminal 712 was the initiator and the second terminal 714 the target. Then the first terminal 712 transmits a first signal 706 in the tone of the symbol corresponding to the CID of the connection 716 in resource A1 702, while the second terminal 714 transmits a second signal 708 in the tone of the symbol corresponding to the CID of the connection 716 in resource A2 704. In an alternative implementation, the CID broadcast period may include a single resource (i.e., just Resource A1 702), in which case, the first and the second terminals 712 and 714 may take turns to broadcast in the CID broadcast periods, e.g., according to a fixed pattern (e.g., alternate even/odd periods or pseudo random). That is, in a first CID broadcast period, the first terminal 712 may transmit on the single resource (e.g., resource A1 702) and the second terminal 714 listens, while on a second broadcast period, the second terminal 714 may transmit on the same single resource (e.g., resource A1 702) while the first terminal 712 listens.

One reason that both terminals 712 and 714 need to send signals in the CID broadcast period is to allow other terminals in the vicinity to be aware that the CID 706 and/or 708 has been occupied. Another reason is for one of the two terminals to monitor the presence of the other terminal. In other words, if one terminal drops out, e.g., due to battery failure, or because the distance between the two terminals increases beyond certain range, the CID broadcast period allows the two terminals 712 and 714 to realize that the connection 716 needs to be tore down and the CID resource unit (e.g., 706 and 708 in resources A1 702) needs to be relinquished. For example, if the first terminal 712 does not detect the CID broadcast signal 708 that needs to be sent by the second terminal 714 in the second resource A2 704, for some period of time, the first terminal 712 may conclude that the connection 716 is down. Subsequently, the first terminal 712 relinquishes the CID 706 and no longer sends the CID broadcast signal 706 in the CID broadcast period. This allows the CID (and CID resource units at 706 and 708) to become available again and be selected by other terminals in the vicinity.

Note that when two terminals start a connection following the protocol shown in FIG. 6, the CID may be unoccupied in the vicinity. However, as the RF condition changes, CID collision may still occur. For example, the two terminals may move to a new location where another pair of terminals may also use a connection associated with the same CID. Using the design of the CID broadcast period in FIG. 7 may not detect such a CID collision easily.

Figure 8:
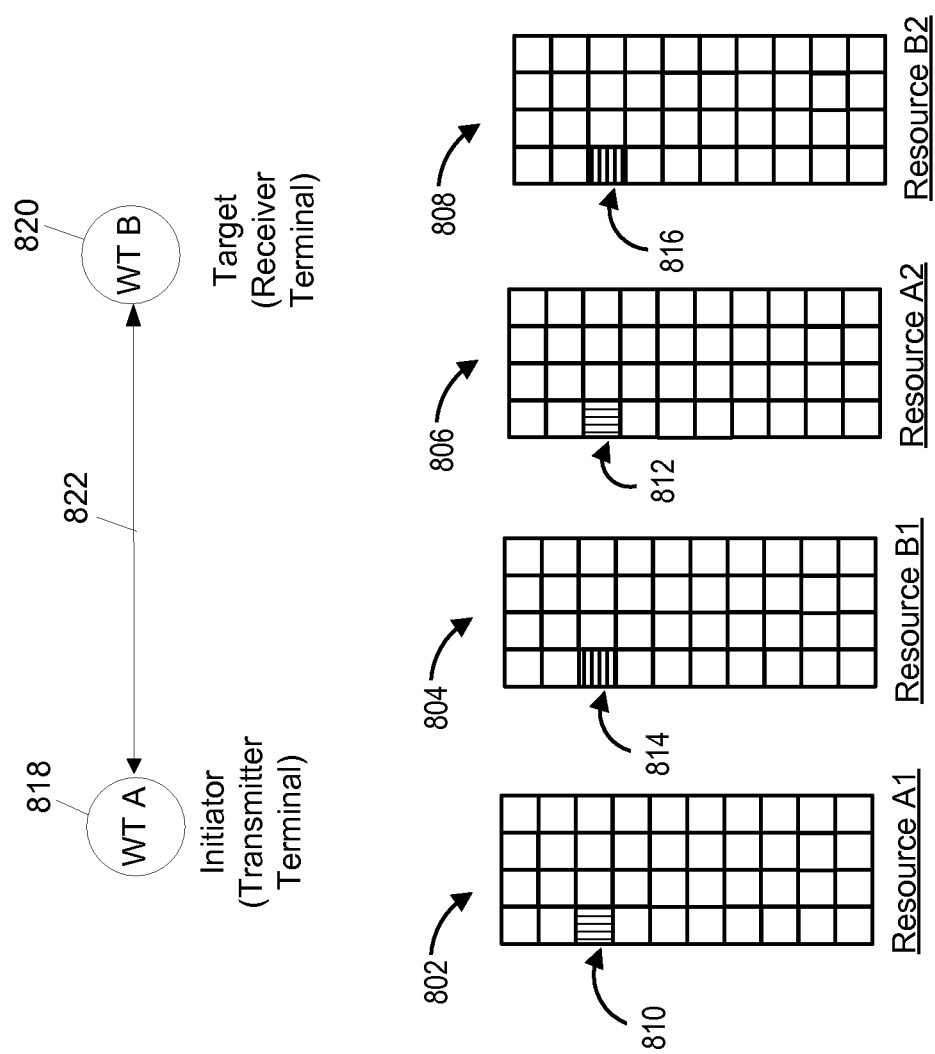
FIG. 8 illustrates one example of a four-part CID broadcast structure where each part covers the whole transmission CID space.

FIG. 8 illustrates one example of a four-part CID broadcast structure to enable detection of CID collision. Similar to the resources A1 702 and A2 704 in FIG. 7, each resource covers the whole transmission CID space. Each transmission CID within the transmission CID space is defined (or associated with) a particular tone/symbol or frequency-time that corresponds to a transmission traffic channel. For example, assuming the transmission CID space spans from 1 to N, each CID broadcast resource A1 802, A2 804, B1 806, and B2 808 may have N degrees of freedom. Similar to FIG. 7, in a connection between a first terminal 818 and a second terminal 820, suppose that the first terminal 818 was the one that initiated the connection 822 (i.e., paging initiator) and the second terminal 820 was the paging target. In one example, the first terminal 818 is assigned to resources A1 802 and B1 804, while the second terminal 820 is assigned to resources A2 806 and B2 808. Such assignment of resources may be implied, where for example, the initiator terminals know that they should use resources A1 802 and B1 804 while the target terminals know that they should use resources A2 806 and B2 808. Note that different assignments of resources to the first and second terminals 818 and 820 are also possible.

The first terminal 818 may select one of the two resources A1 802 and B1 804 to send a signal corresponding to the CID of the connection 822 between the first and the second terminals 818 and 820. The first terminal 818 may then listen on the non-selected resource to determine if another terminal is using the same transmission CID. For example, the first terminal 818 may select to transmit a CID broadcast signal 810 defined by a location (tone/symbol) within the CID space in resource A 802, while listening at position 814 (i.e., resource unit) in resource B1 804 for collisions. If the first terminal 818 detects that a CID broadcast signal is sent in position 814, the first terminal 818 may conclude that another terminal may also be using the same CID, i.e., CID collision is detected.

Similarly, the second terminal 820 may select one of the two resources A2 806 and B2 808 to send a signal corresponding to the CID of the connection 822 between the first and the second terminals 818 and 820. For example, the second terminal 820 may select to transmit a CID broadcast signal 812 defined by a location within the CID space in resource A2 806.

At any particular CID broadcast period, the selection of one resource over another resource (e.g., between resources A1 and B1) may be pseudo-randomly determined as a function of terminal or device IDs of the first and/or second terminals. For example, the first terminal 818 may use its device ID and a pseudo-random function to determine which resource to select between resources A1 802 and B1 804, while the second terminal 820 may use its device ID and the same pseudo-random function to determine which resource to select between resources A2 806 and B2 808. The selection may also be determined as a function of a time counter. For instance, the first and the second terminals 818 and 820 may derive the value of the time counter from a common timing source. This way, the selection varies as the time evolves.

In a preferred embodiment, the first terminal 818 knows which resource (either A2 or B2) the second terminal 820 will select between A2 806 and B2 808. This is possible because the first terminal 818 has the connection 822 with the second terminal 820 and knows how the second terminal 820 may select. For example, the second terminal 820 may select to transmit a CID broadcast signal in resource A2 806. As described in FIG. 7, in order to check the presence of the second terminal 820, the first terminal 818 monitors to see whether a CID broadcast signal 812 corresponding to the CID has been received in resource A2 806. If so, the first terminal 818 may conclude that the connection 822 is still alive. No further action is needed. Otherwise, the first terminal 818 may conclude that the connection 822 is lost and the first terminal 818 may then tear down the connection 822 and relinquish the CID by restraining from transmitting CID broadcast signals in positions 810 and 814 corresponding to the CID. Moreover, the first terminal 818 monitors to whether a CID broadcast signal 816 corresponding to the CID has been received in resource B2 808. If so, the first terminal 818 may conclude that another terminal may also use the same CID, i.e., CID collision is detected. The first terminal 818 may inform the second terminal 820 of such ID collision so that their connection 822 may need to change to a different CID.

Note that, in one example, the first and second terminals 818 and 820 may periodically, pseudo-randomly, or randomly select between their resources A1 802, A2 804, B1 806, and B2 808. By periodically, pseudo-randomly, or randomly changing the resource used at a particular time interval, the chances of detecting collision are improved. That is, while it may be possible that the first terminal and yet another terminal may select the same transmission CID in the same resource for a particular time interval, it is less likely that they will continually choose the same resource when each independently selects between the two resources every so often.

Figure 9A:
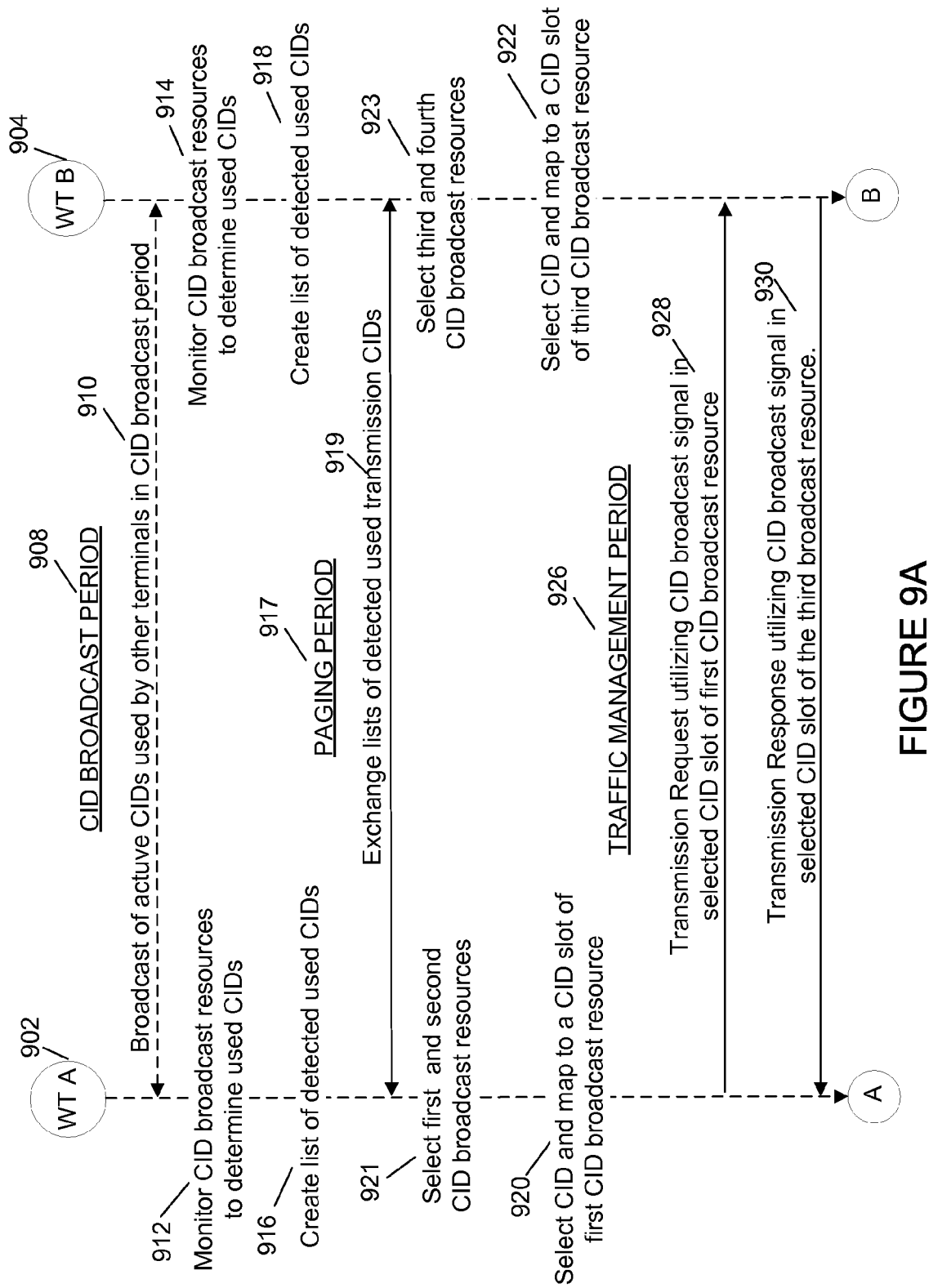
FIG. 9 (comprising FIGS. 9A and 9B) is a block diagram illustrating the use of orthogonal transmission CIDs within a peer-to-peer communication connection between terminals.
Figure 9B:
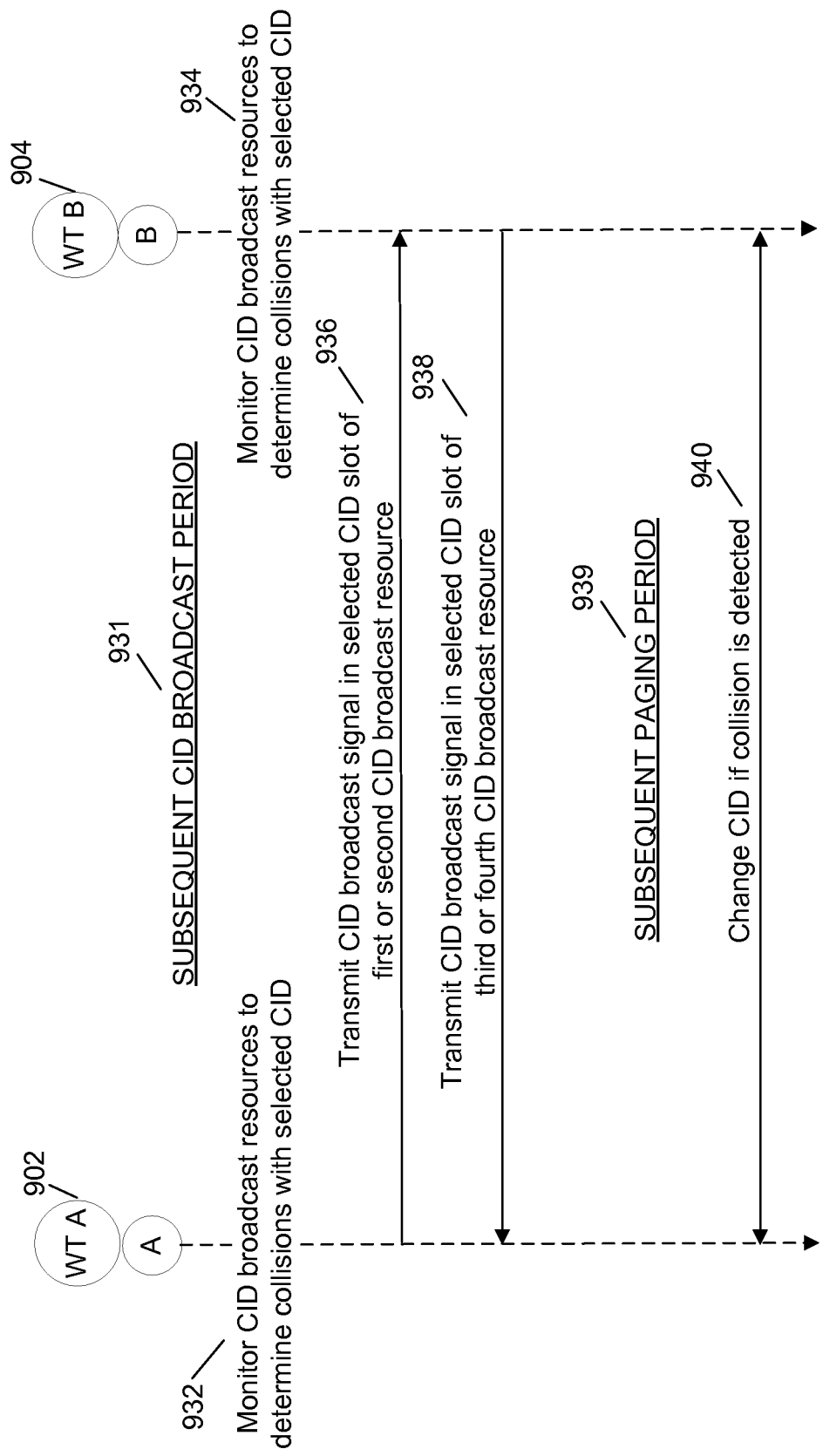

FIG. 9 (comprising FIGS. 9A and 9B) is a block diagram illustrating the use of orthogonal transmission CIDs within a peer-to-peer communication connection between terminals. In establishing a peer-to-peer communication connection, a first terminal WT A 902 and a second terminal WT B 904 may utilize a CID broadcast period as illustrated in FIGS. 6, 7 and 8. During a CID broadcast period 908, neighboring terminals that currently have active connections indicate the CIDs they are using by sending a tone at a symbol (in a selected CID broadcast resource) corresponding to their selected transmission CID 910. The first terminal WT A 902 and second terminal WT B 904 may monitor the CID broadcast(s) (e.g., CID broadcast resources) to determine which CIDs are used by others 912 and 914. Each terminal WT A 902 and WT B 904 may then independently create lists of the detected used transmission CIDs 916 and 918. Note that due to the difference in their respective RF conditions, the two lists may be different since one terminal may be able to detect some used transmission CIDs that the other terminal does not. The terminals WT A 902 and WT B 904 may then exchange their lists of detected transmission CIDs 919, for example, during the paging period 917 (also illustrated in FIG. 6).

During a paging period 917 (shown in FIG. 6), the terminals WT A 902 and WT B 904 may select an unused transmission CID in the CID broadcast resource structure 920 and 922. The first terminals 902 may also select a first and second CID broadcast resources 921, where one of the two CID broadcast resources can be used to transmit a CID broadcast signal while the other may be used to monitor for CID collisions. Similarly, the second terminal 904 may also select a third and fourth CID broadcast resource 923, where one of the two CID broadcast resources can be used to transmit a CID broadcast signal while the other may be used to monitor for CID collisions.

Figure 16:
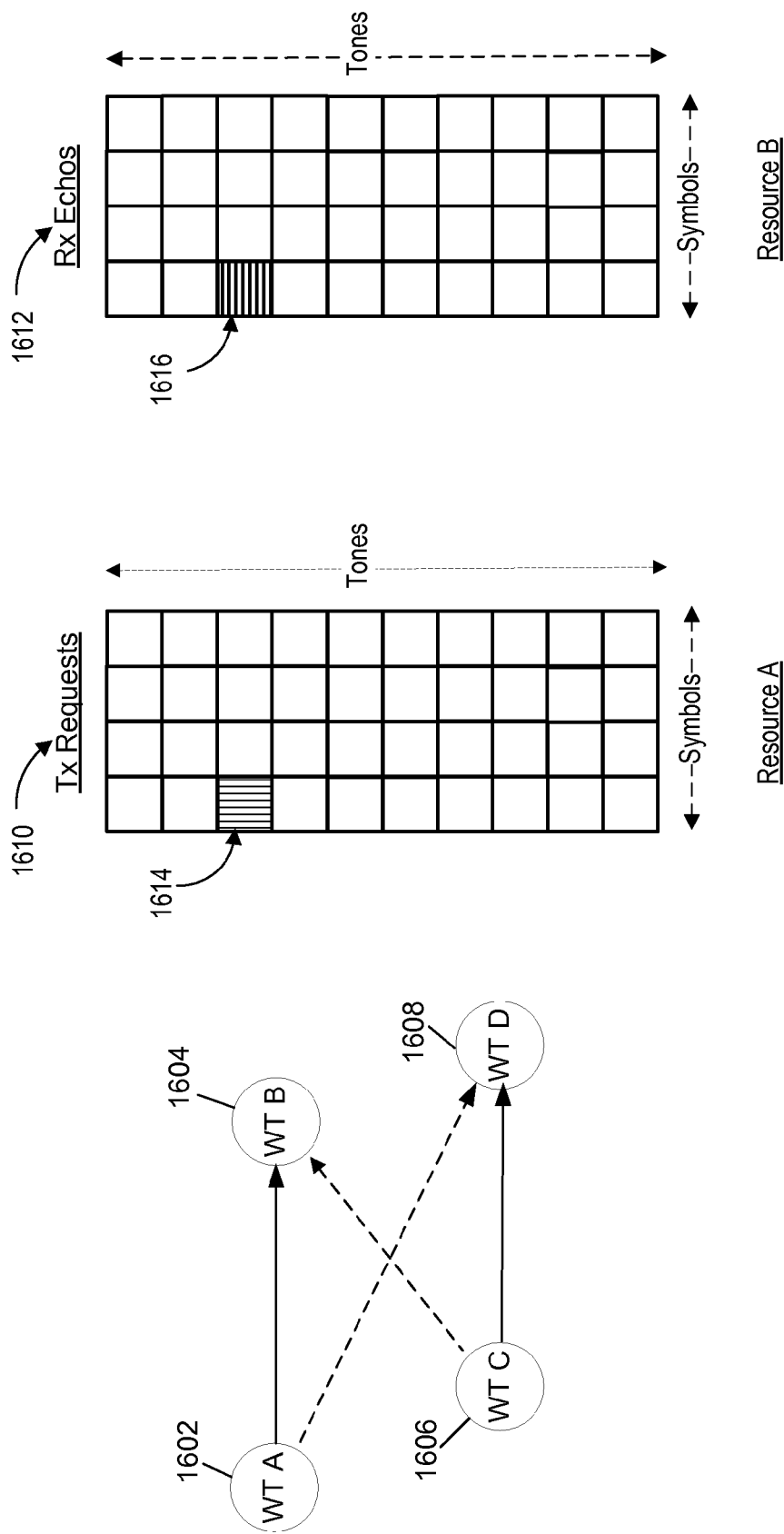
FIG. 16 is a diagram illustrating the traffic control channel using orthogonal CIDs.

Having selected a transmission CID for their peer-to-peer connection, during a traffic management period 926, the first wireless terminal WT A 902 may then transmit a transmission request to the second terminal WT B 904, using a dedicated channel resource, e.g., a particular tone in an OFDM symbol, in the traffic management channel period corresponding to the selected CID (as shown 1614 in FIG. 16). For instance, the Transmission request may utilize a CID broadcast signal in a selected CID slot of the first CID broadcast resource 928. Upon receiving this transmission request, the second terminal WT B 904 then sends a request response, again using a dedicated channel resource, e.g., a particular tone in an OFDM symbol, in the traffic management channel period corresponding to the selected CID (as shown 1616 in FIG. 16). For instance, the request response may utilize a CID broadcast signal in a selected CID slot of the third CID broadcast resource 930.

In a subsequent CID broadcast period 931, the first and second terminals 902 and 904 may indicate to others that the selected CID is being used. For instance, the first terminal WT A 902 may send a CID broadcast signal in the CID slot of either the first or second CID broadcast resource to inform to the second terminal WT B 904 that the connection is still alive. The second terminal WT B 904 may also send a CID broadcast signal in the CID slot of either the third or fourth CID broadcast resource to inform to the first terminal WT A 902 that the connection is still alive.

Additionally, the first and second terminals WT A 902 and WT B 904 may monitor the CID broadcast resources to determine whether a collision exists with the selected CID 932 and 934; i.e., to determine if another terminal has selected the same transmission CID.

If a CID collision is detected, the first and second terminals WT A 902 and WT B 904 may negotiate to change their CID 940 during a subsequent paging period 939.

Method for Collision Avoidance

Figure 10:
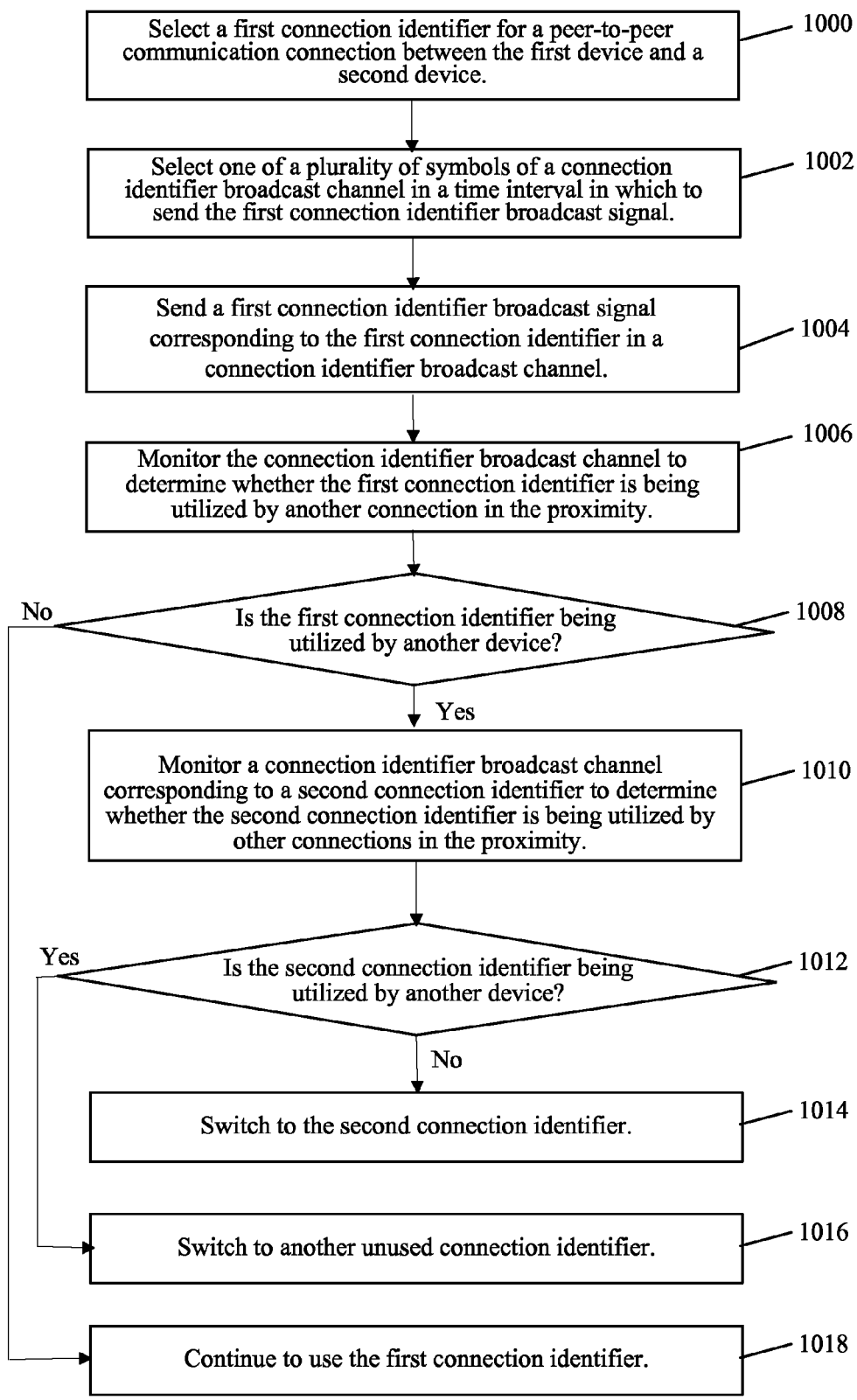
FIG. 10 illustrates a method operational in a first device for avoiding channel collisions and interference in peer-to-peer networks.

FIG. 10 illustrates a method operational in a first device for avoiding channel collisions and interference in peer-to-peer networks. A first connection identifier is selected for a peer-to-peer communication connection between the first device and a second device in a wireless communications network 1000. Prior to sending the first connection identifier broadcast signal, the first device may select one of a plurality of symbols of a connection identifier broadcast channel in a time interval in which to send the first connection identifier broadcast signal 1002.

The first device then sends a first connection identifier broadcast signal corresponding to the first connection identifier in a connection identifier broadcast channel 1004. For instance, the first connection identifier broadcast signal may be sent in the selected symbol of the connection identifier broadcast channel within the time interval. The first device then monitors the connection identifier broadcast channel to determine whether the first connection identifier is being utilized by another connection in the proximity 1006. As used herein, a connection is in the "proximity" if it may be detected by the first device, if the peer terminals utilizing such connection are within radio range of the first device, or if it may cause interference above an acceptable threshold to the connection of the first device. If the connection identifier is not being utilized by another device (for another connection), then the first device may continue to use the first connection identifier 1018 for its peer-to-peer connection with the second device.

Otherwise, if it is determined that the first connection identifier is being utilized by another connection (another device) in the proximity 1008, the first device monitors a connection identifier broadcast channel corresponding to a second connection identifier to determine whether the second connection identifier is being utilized by other connections (devices) in the proximity 1010. If the second connection identifier is not being utilized by another connection (or another device) 1012, the first device switches to the second connection identifier 1014. Otherwise, if the second connection identifier is being used by another connection or device, another unused connection identifier may be selected 1016 by monitoring the connection identifier broadcast channel for unused identifiers.

The first and second connection identifiers may belong to a predetermined set of a plurality of connection identifiers. For example, the first and second connection identifiers may be selected from the unused or available transmission CIDs in a CID broadcast resource structure, such as illustrated in FIGS. 7 and 8 for example.

In one example, the first device may receive a broadcast signal from a common network timing source. For example, this common network timing source may be derived from a WAN signaling or beacons. The value of a time counter can then be determined as a function of the received broadcast signal and changes from one time interval to another time interval. The selected symbol (in step 1002) may be selected as a function of the value of the time counter. Each of the plurality of symbols (in step 1002) may be an OFDM symbol including a plurality of tones, and the first connection identifier broadcast signal is sent in one of the plurality of tones in the selected symbol.

In one example, the combination of a selected OFDM symbol and tone may be determined as a function of the first connection identifier, where a different connection identifier corresponds to a different combination of selected OFDM symbol and tone. A plurality of OFDM symbols may be associated with the first connection identifier. The selected symbol may be selected from the plurality of OFDM symbols being associated with the first connection identifier as a function determined by both the first and the second devices.

The second connection identifier broadcast signal may be received in the remaining OFDM symbols of the plurality of OFDM symbols being associated with the first connection identifier.

Figure 11:
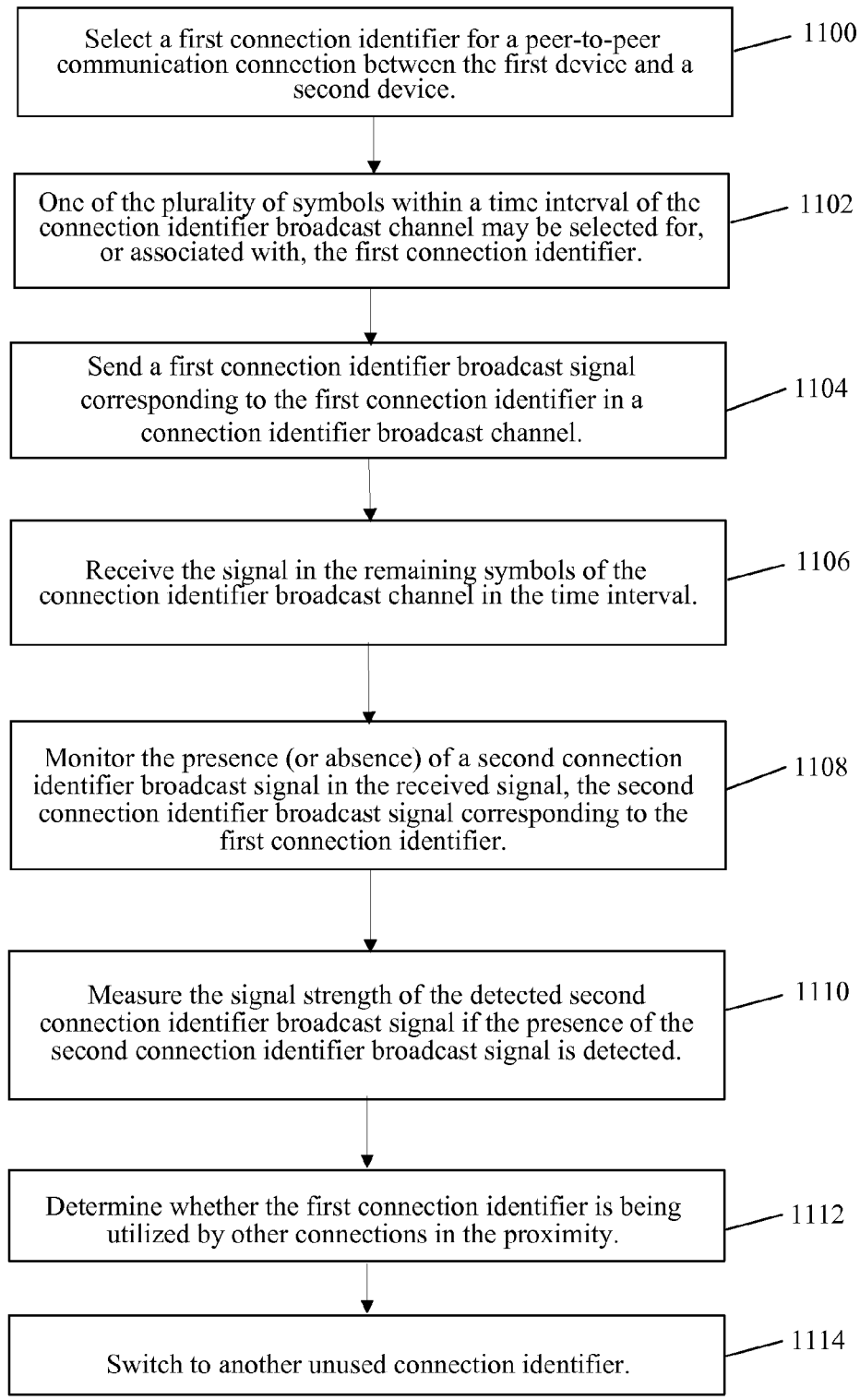
FIG. 11 illustrates a method for determining whether a connection identifier is or is not being used by another connection within a peer-to-peer network.

FIG. 11 illustrates a method for determining whether a connection identifier is or is not being used by another connection within a peer-to-peer network. In one example, the connection identifier broadcast channel may include a plurality of symbols in a time interval. As with the example of FIG. 10, a first device may select a first connection identifier for a peer-to-peer communication connection between the first device and a second device 11100. One of the plurality of symbols within a time interval of the connection identifier broadcast channel may be selected for, or associated with, the first connection identifier 1102. The first device may then send a first connection identifier broadcast signal corresponding to the first connection identifier in a connection identifier broadcast channel 1104.

Subsequently, the first device may listen on the connection identifier broadcast channel to receive or detect a signal in the remaining symbols of the connection identifier broadcast channel in the time interval 1106. The first device may monitor for the presence (or absence) of a second connection identifier broadcast signal in the received signal, wherein the second connection identifier broadcast signal corresponds to the first connection identifier 1108. If the presence of the second connection identifier broadcast signal is detected the first device may measure the signal strength of the detected second connection identifier broadcast signal 1110.

The first device may determine whether the first connection identifier is being utilized by other connections in the proximity in a number of ways. For example, if the second connection identifier broadcast signal is present in the received signal, the first device may assume that another connection is also utilizing the first connection identifier. In another example, if the signal strength of the second connection identifier broadcast signal in the received signal is above a first threshold, the first device may assume that another connection is also utilizing the first connection identifier. In yet another example, if the ratio of the signal strength of the second connection identifier broadcast signal and the signal strength of a connection identifier broadcast signal corresponding to another connection identifier in the received signal is above a second threshold, the first device may assume that another connection is also utilizing the first connection identifier.

Figure 12:
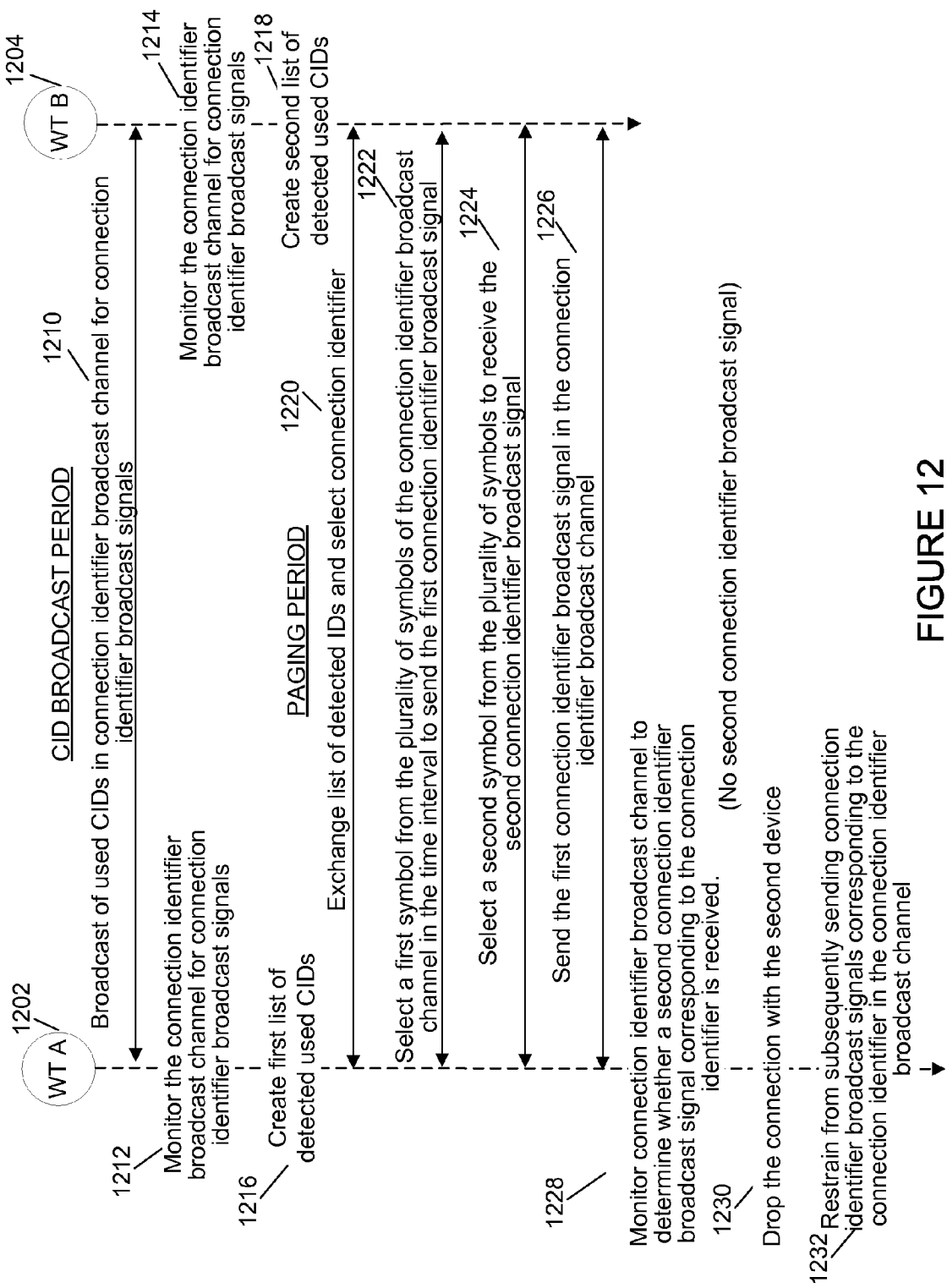
FIG. 12 is a block diagram illustrating another use of orthogonal transmission CIDs within a peer-to-peer communication connection between terminals.

FIG. 12 is a block diagram illustrating another use of orthogonal transmission CIDs within a peer-to-peer communication connection between terminals. In establishing a peer-to-peer communication connection, a first terminal WT A 1202 and a second terminal WT B 1204 may utilize a CID broadcast period as illustrated in FIGS. 6, 7 and 8. The CID broadcast may be implemented within connection identifier broadcast channel that includes a plurality of symbols in a time interval. A symbol may be used to represent a CID or connection identifier. Other nearby terminals may broadcast their used CIDs in connection identifier broadcast channel for connection identifier broadcast signals 1210. The first wireless terminal WT A 1202 and second wireless terminals WT B 1204 may monitor the connection identifier broadcast channel for connection identifier broadcast signal 1212 and 1214. Based on the received connection identifier broadcast signals, the first wireless terminal WT A 1202 and second wireless terminals WT B 1204 may each create their own list of detected used transmission CIDs 1216 and 1218 and exchange their list in order to select a connection identifier for a peer-to-peer communication connection between the first device and a second device 1220.

A first symbol is then selected from the plurality of symbols of the connection identifier broadcast channel in the time interval for the first terminal 1202 to send a first connection identifier broadcast signal 1222. Similarly, a second symbol may be selected from the plurality of symbols for the first terminal 1202 to receive the second connection identifier broadcast signal 1224, which is to be transmitted by the second terminal 1204. The first and the second terminals 1202 and 1204 may have a connection associated with the CID. The first and second connection identifier broadcast signals correspond to the same CID. The first terminal 1202 is supposed to transmit the first CID broadcast signal while the second terminal 1204 is supposed to transmit the second CID broadcast signal. The first terminal 1202 monitors the presence of the second CID broadcast signal to see whether the connection is still alive. If the second CID broadcast signal is received, e.g., with sufficient signal strength, then the first terminal may conclude the connection is alive. Otherwise, the first terminal 1202 may conclude the connection needs to be torn down. In one example, the first terminal 1202 may need to detect several occurrences of the absence of the second CID broadcast signals before it makes such a conclusion.

The first wireless terminal WT A 1202 may then send the first connection identifier broadcast signal in the connection identifier broadcast channel 1226. The first terminal WT A 1202 may then monitor the connection identifier broadcast channel to determine whether a second connection identifier broadcast signal corresponding to the CID is received 1228.

If the second connection identifier broadcast signal is not detected, the first terminal WT A 1202 may drop the connection with the second terminal WT B 1230 and restrains from subsequently sending connection identifier broadcast signals corresponding to the connection identifier in the connection identifier broadcast channel 1232.

Figure 13:
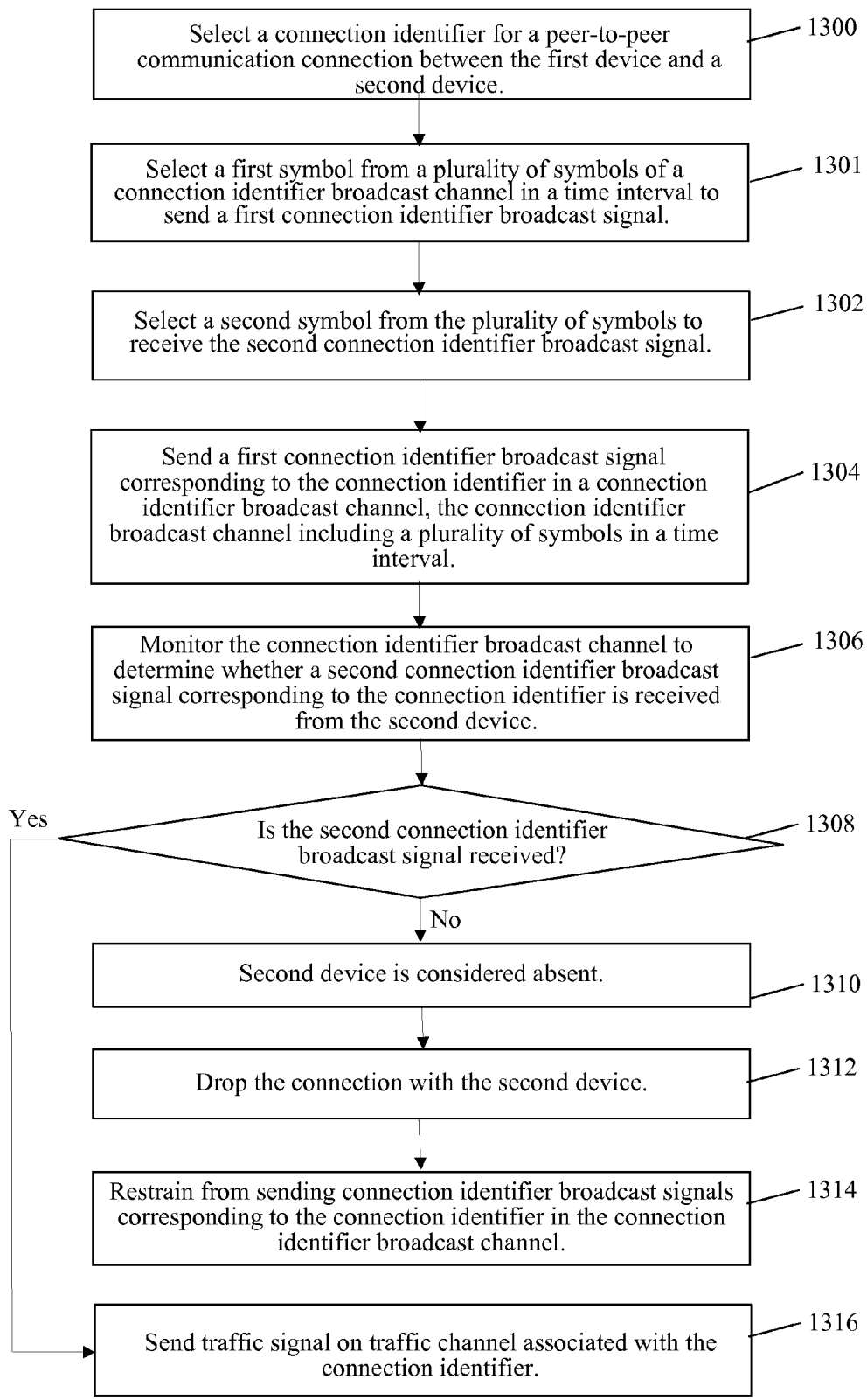
FIG. 13 illustrates a method of operating a first device for maintaining a connection identifier for a peer-to-peer communication connection between the first device and a second device in a wireless communications network.

FIG. 13 illustrates a method of operating a first device for maintaining a connection identifier for a peer-to-peer communication connection between the first device and a second device in a wireless communications network. A connection identifier is selected for a peer-to-peer communication connection between the first device and a second device 1300. A connection identifier broadcast channel may include a plurality of symbols in a time interval. The first device, alone or in conjunction with the second device, may select a first symbol from the plurality of symbols of the connection identifier broadcast channel in the time interval to send the first connection identifier broadcast signal 1301. The first device, alone or in conjunction with the second device, may also select a second symbol from the plurality of symbols to receive the second connection identifier broadcast signal 1302. The first device then sends a first connection identifier broadcast signal corresponding to the connection identifier in a connection identifier broadcast channel 1304. The connection identifier broadcast channel may be monitored to determine whether a second connection identifier broadcast signal corresponding to the connection identifier is received from the second device 1306.

If the second connection identifier broadcast signal is not received 1308, the second device is considered absent 1310. Consequently, the first device may drop the connection with the second device 1312 and restrain from sending connection identifier broadcast signals corresponding to the connection identifier in the connection identifier broadcast channel 1314. Otherwise, if the second connection identifier broadcast signal is received 1308, the first device may send/receive traffic signal on traffic channel associated with the connection identifier 1316.

The first and second selected symbols may be selected as a function of the connection identifier. The selection of the first and second symbols may be determined jointly or individually by the first and second devices. Each of the plurality of symbols may be an OFDM symbol including a plurality of tones, said first connection identifier broadcast signal is sent in one of the plurality of tones in the first selected symbol, and said second connection identifier broadcast signal is received in one of the plurality of tones in the second selected symbol. The combinations of selected OFDM symbol and tone of the first and the second connection identifier broadcast signals may be determined as a function of the connection identifier, and different connection identifiers correspond to different combinations of selected OFDM symbol and tone. The first and the second selected OFDM symbols may be at least one OFDM symbol apart.

The connection identifier broadcast channel includes at least a first and a second predetermined subsets of OFDM symbols, the first selected OFDM symbol in which the first connection identifier broadcast signal is sent belongs to the first subset, and the second selected OFDM symbol in which the second connection identifier broadcast signal is received belongs to the second subset. The partition of the first and second subsets may be independent of any connection identifier.

Figure 14:
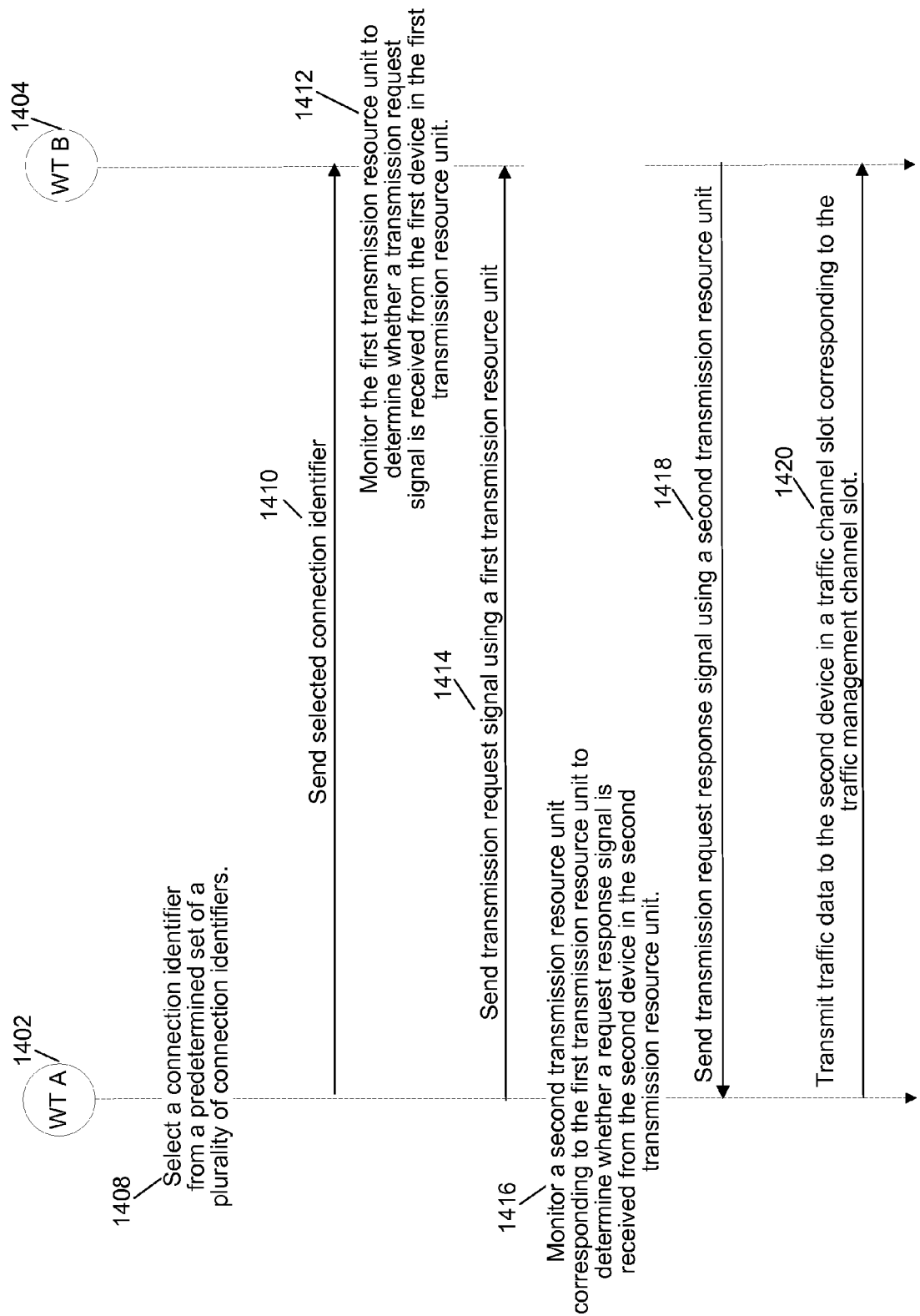
FIG. 14 is a block diagram illustrating another use of orthogonal transmission CIDs within a peer-to-peer communication connection between terminals.

FIG. 14 is a block diagram illustrating another use of orthogonal transmission CIDs within a peer-to-peer communication connection between terminals. In establishing a peer-to-peer communication connection, a first terminal WT A 1402 and a second terminal WT B 1404 may utilize a CID broadcast period as illustrated in FIGS. 6, 7 and 8. The CID broadcast may be implemented within connection identifier broadcast channel that includes a plurality of symbols in a time interval. A symbol may be used to represent a transmission CID or connection identifier. A CID is associated with a connection between the first and the second terminals 1402 and 1404.

A connection identifier is selected by the first device WT A 1402 from a predetermined set of a plurality of connection identifiers 1408. The first device WT A 1402 sends a paging request message to the second device WT B 1404 including control information indicative of the selected connection identifier 1410. The first terminal 1402 may include one or more selected connection identifiers in the paging request message. The first terminal 1402 selects one connection identifier if it is determined that the connection identifier is not currently used or occupied by other connections in the proximity. To do this, the first terminal 1402 may monitor the CID broadcast period, as shown in FIG. 7 or FIG. 8, to determine whether a particular CID is occupied, e.g., by measuring the strength of the CID broadcast signal corresponding to the CID. Meanwhile, the second terminal 1404 may also determine the list of unoccupied CIDs based on its own measurement of the CID broadcast period. Upon receiving the proposed list of selected connection identifiers from the first terminal, the second device WT B 1404 may compare the list from the first terminal with its own list to determine whether a CID can be selected that is considered unoccupied from the perspective of both the first and the second terminals. If so, the second terminal WT B 1404 responds to the first terminal 1402 to include the selected CID in the paging response message.

After the two devices have established the connection and the associated CID, they can further exchange control and data traffic. For example, the first device WT A 1402 then transmits a transmission request signal to the second device WT B 1404 using a first transmission resource unit 1414. The first transmission resource unit may include a subset of tones in a subset of symbols within a traffic control channel slot and the first transmission resource unit may be determined as a function of the connection identifier. For instance, the first device WT A 1402 may transmit on a selected symbol/tone combination (associated with the connection identifier) in Resource A 1610 in FIG. 16.

The first device WT A 1402 also monitors a second transmission resource unit corresponding to the first transmission resource unit to determine whether a request response signal is received from the second device 1404 in the second transmission resource unit 1416. The second transmission resource unit may be a subset of tones in a subset of symbols within the traffic control channel slot. For instance, the first device WT A 1402 may monitor on a selected symbol/tone combination (associated with the connection identifier) in Resource B 1612 in FIG. 16.

Upon receiving the transmission request, the second device WT B 1404 sends a request response signal to the first device WT A 1402 using the second transmission resource 1418. For instance, the second device WT B 1404 may send the request response signal on the selected symbol/tone combination (associated with the connection identifier) in Resource B 1612 in FIG. 16.

If the first device WT A 1402 receives the request response 1418, it may transmit traffic data to the second device WT B 1404 in a traffic channel slot corresponding to the traffic control channel slot 1420 (i.e., associated with the connection identifier).

Figure 15:
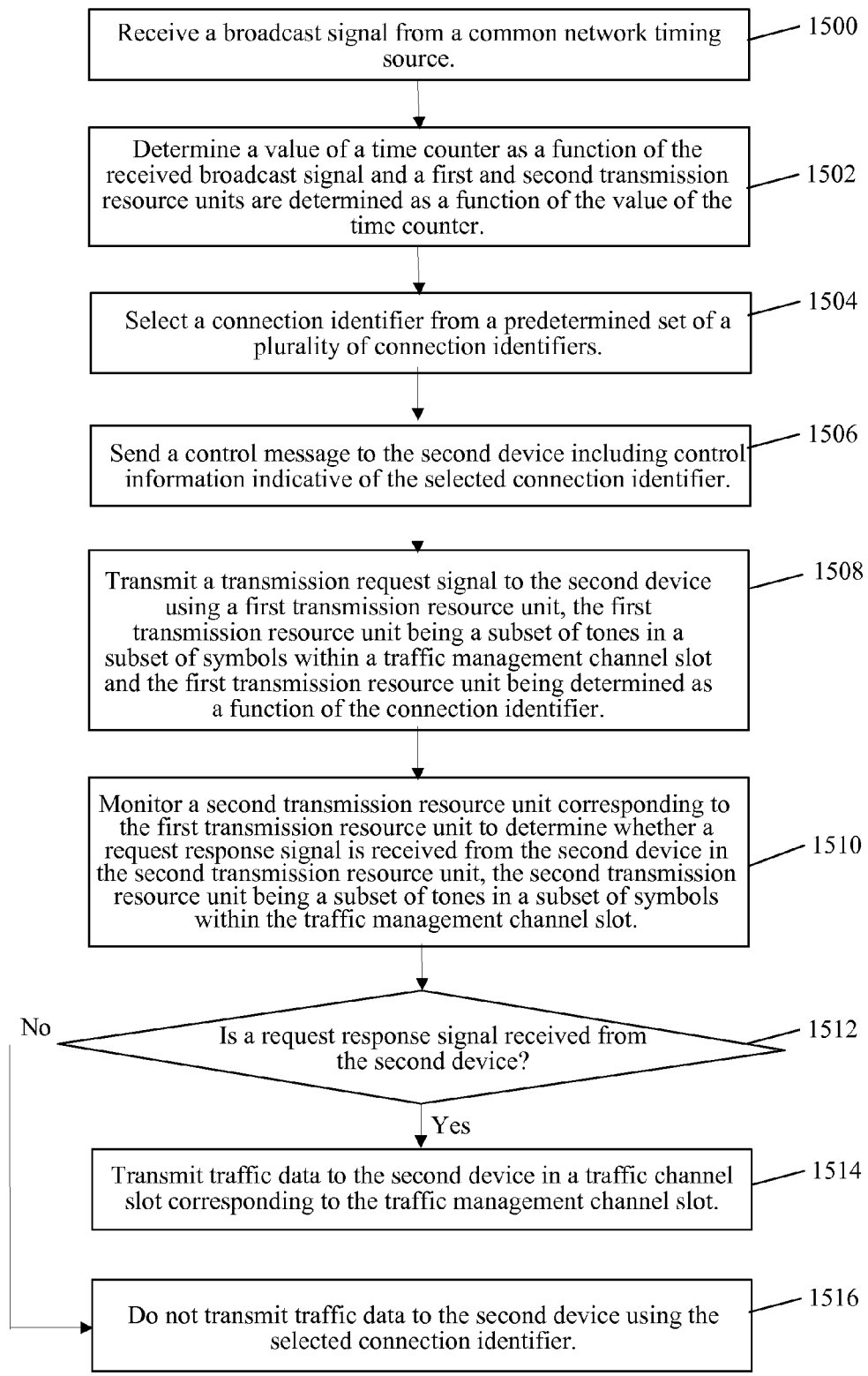
FIG. 15 illustrates a method operational in a first device for selecting and utilizing a connection identifier for a peer-to-peer communication connection between the first device and a second device in a wireless communications network.

FIG. 15 illustrates a method operational in a first device for selecting and utilizing a connection identifier for a peer-to-peer communication connection between the first device and a second device in a wireless communications network. A broadcast signal is received from a common network timing source 1500. For instance, a WAN in which the first and second devices operate may provide beacons from which the common network timing can be ascertained. The value of a time counter may be determined as a function of the received broadcast signal. The first and second transmission resource units in the traffic control channel are determined as a function of the value of the time counter 1502, as well as the CID of the connection between the first and the second terminals. A "transmission resource unit" may be particular symbol/tone combination within the traffic control channel resource. For example, tone/symbol 1614 and 1616 in both Resources A 1610 and B 1612 in FIG. 16, may be determined or selected as a function of the value of the time counter and the CID.

The connection identifier is selected from a predetermined set of a plurality of connection identifiers 1504. A connection identifier broadcast channel may be previously monitored to determine whether the connection identifier is being utilized by other connections in the proximity. The connection identifier is selected only if it is determined that the connection identifier is not being utilized by another connection in the proximity.

To determine whether the connection identifier is not being utilized by other connections in the proximity, the first device may detect the presence (or absence) of a connection identifier broadcast signal in the connection identifier broadcast channel, the connection identifier broadcast signal corresponding to the connection identifier. If the presence of the connection identifier broadcast signal is detected, the first device may measure the signal strength of the connection identifier broadcast signal. The first device may determine that the connection identifier is not being utilized by other connections in the proximity if either (a) the connection identifier broadcast signal is not present, (b) the signal strength of the connection identifier broadcast signal is below a first threshold, or (c) the ratio of the signal strength of the connection identifier broadcast signal and the signal strength of a connection identifier broadcast signal corresponding to another connection identifier is below a second threshold.

Each of the predetermined set of a plurality of connection identifiers may correspond to a unique combination of tone and OFDM symbol in a traffic control channel slot to be used as either the first or second transmission resource units. For a given value of the time counter, first transmission resource units determined by different connection identifiers may be orthogonal with each other (i.e., two different connection identifiers correspond to two distinct transmission resource units) and second transmission resource units determined by different connection identifiers may be orthogonal with each other.

A control message may be sent by the first device to the second device indicating the selected connection identifier 1506. In one example, the control message may be a paging request message indicating that the first device intends to establish a connection with the second device in which the first device proposes to use the selected connection identifier to identify the connection. In another example, the control message may be a paging response message responding to a paging request message received from the second device, where the paging response message may indicate that the first device agrees to establish a connection with the second device and that the first device proposes to use the selected connection identifier to identify the connection.

After the connection has been established between the first and the second devices and the CID has been selected, the CID can be used to schedule data and control traffic between the two devices. For example, in a subsequent traffic slot, a transmission request signal is transmitted from the first device to the second device using a first transmission resource unit, the first transmission resource unit being a subset of tones in a subset of symbols within a traffic control channel slot and the first transmission resource unit being determined as a function of the connection identifier 1508. A second transmission resource unit corresponding to the first transmission resource unit is monitored to determine whether a request response signal is received from the second device in the second transmission resource unit, the second transmission resource unit being a subset of tones in a subset of symbols within the traffic control channel slot 1510. The second transmission resource unit may also be determined as a function of the connection identifier.

The first device then determines if a request response signal is received from the second device 1512. If so, traffic data is transmitted to the second device in a traffic channel slot corresponding to the traffic control channel slot 1514. Otherwise, if no request response signal is received, the first device does not transmit traffic data to the second device using the selected connection identifier 1516.

The traffic control channel slot may include a plurality of OFDM symbols, each OFDM symbol including a plurality of tones, and each of the first and second transmission resource units may include at least one tone in one of the plurality of symbols in the traffic control channel slot. A different connection identifier may correspond to a different tone and OFDM symbol combination in the traffic control channel slot to be used as either the first or second transmission resource units.

Illustration of Traffic Control Channel Using Orthogonal CIDs

FIG. 16 is a diagram illustrating the traffic control channel using orthogonal CIDs. In this example, a first device WT A 1602 and a second device WT B 1604 have established a peer-to-peer connection associated with a first CID, while a third device WT C 1606 and a fourth device WT D 1608 have established another peer-to-peer connection associated with a second CID, which is different from the first CID.

A traffic slot as shown in FIG. 2 includes a traffic management channel period and a traffic channel period. In particular, the connection scheduling portion of the traffic management channel period is used to manage traffic interference between the two connections. In one embodiment, the connection scheduling portion includes resources A 1610 and B 1612. In each of resources A and B, there is a plurality of symbols, each symbol including a number of tones. Each small box in resources A and B represents a basic transmission resource unit, which is a tone over one symbol, e.g., OFDM symbol.

The connection of the first CID has a reserved transmission resource unit in both resources A and B. The two transmission resource units are determined by the first CID of the connection between WT A and WT B. Similarly, the connection of the second CID has a reserved transmission resource unit in both resources A and B. The two transmission resource units are determined by the CID of the connection between WT C and WT D. In a preferred embodiment, connections of different CIDs correspond to different reserved transmission resource units. In this sense, the CIDs are orthogonal with each other.

First device WT A 1602 can transmit a transmission request signal using the reserved transmission resource unit 1614 to indicate its intension to send traffic to second device WT B 1604. Second device WT B 1604 can then transmit a request response using the reserved transmission resource unit 1616 to indicate its intension to receive traffic from the first device WT A 1602, if it is so determined. After transmitting the transmission request, first device WT A 1602 monitors to determine whether the second device WT B 1604 has transmitted a request response. If so, the first device WT A 1602 proceeds to send traffic in the corresponding traffic channel period of the current traffic slot. Clearly, if the two connections happen to use the same CID, the terminals of both connections tend to believe that the transmission resource units are reserved for the exclusive by them. This will lead to erroneous operation. For example, after WT A 1602 transmits a transmission request using the reserved transmission resource unit, both WT B 1604 and WT D 1608 will think that the request signal is sent by WT A 1602 and WT C 1606 respectively. Such confusion will lead to adverse system operations. Thus, it is important to avoid and detect CID collision.

If interference is perceived by a device, it may negotiate a different transmission CID (symbol/tone combination in Resources A and B) to use for its peer-to-peer connection.

Figure 17:
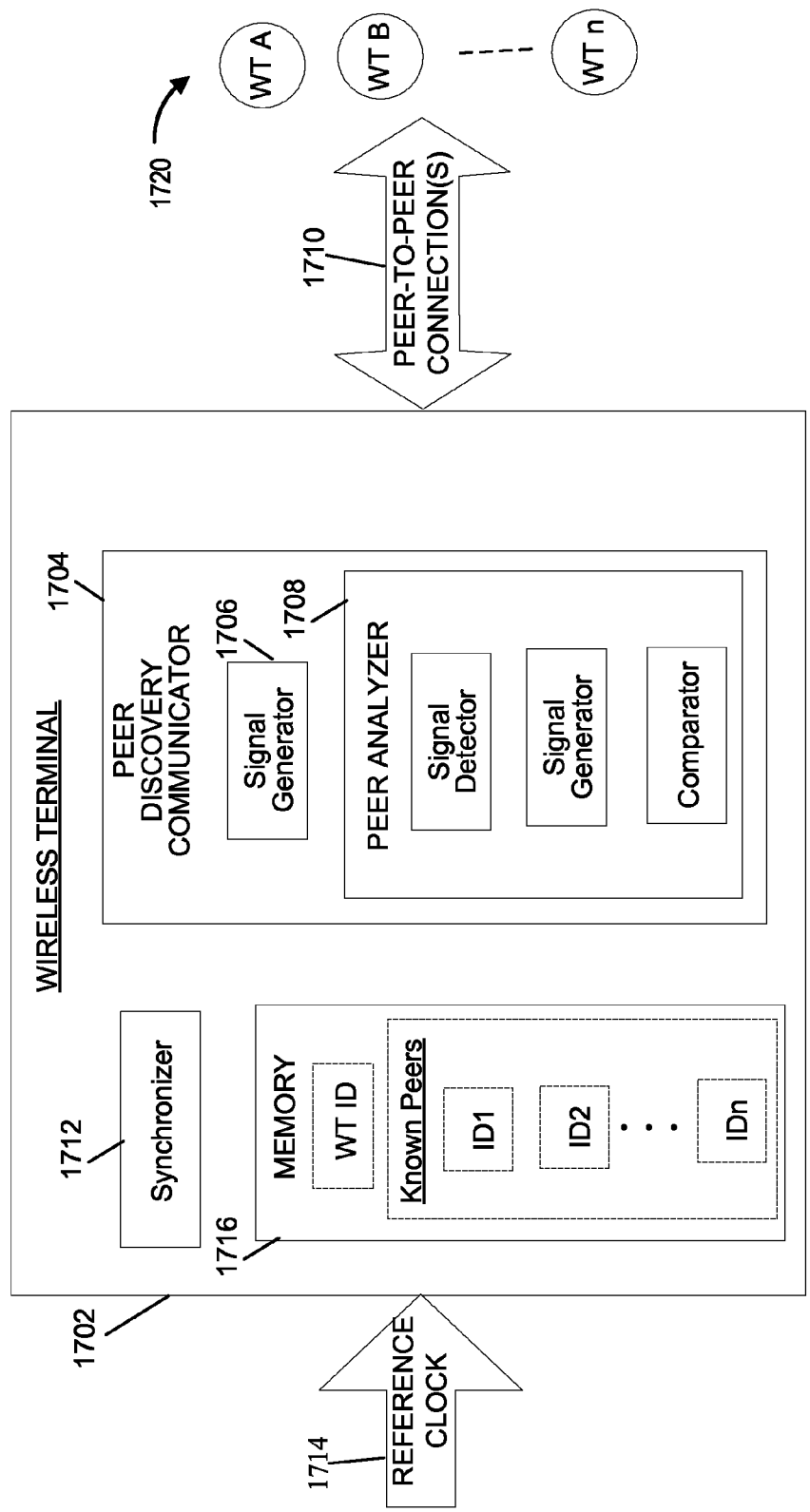
FIG. 17 is a block diagram illustrating an example of a wireless terminal that may be configured to perform orthogonal transmission CID selection in a peer-to-peer network.

Wireless Terminal Configured to Use Orthogonal Transmission CIDs in P2P Connection FIG. 17 is a block diagram illustrating an example of a wireless terminal that may be configured to perform orthogonal transmission CID selection in a peer-to-peer network. The wireless terminal 1702 may communicate directly with substantially any number of disparate wireless terminals 1720 over peer-to-peer connections.

Wireless terminal 1702 may include a peer discovery communicator 1704 that may effectuate encoding, sending, receiving, evaluating, of signals associated with peer discovery during a peer discovery interval (or a plurality of peer discovery intervals). Peer discovery communicator 1704 may further comprise a signal generator 1706 and a peer analyzer 1708. The signal generator 1708 may generate and/or transmit a signal to disparate wireless terminals 1720 via wireless peer-to-peer connections 1710 and those wireless terminals may evaluate the signal to detect and identify wireless terminal 1702. Further, peer analyzer 1708 may receive signal(s) sent from disparate wireless terminal(s) 1720 and may evaluate the received signal(s) to detect and identity disparate wireless terminal(s) 1720 to which the received signal(s) correspond.

Wireless terminal 1702 may additionally include a synchronizer 1712 that conforms timing between wireless terminal 1702 and the disparate wireless terminals 1720. Synchronizer 1712 may obtain its timing from broadcast information (e.g., a common clock reference 1714) from a base station (not shown) in a vicinity of wireless terminal 1702. Similarly, synchronizers of the disparate wireless terminals 1720 may obtain their respective timing from the same broadcast information (reference clock 1714). The broadcast information may be, for example, a single-tone beacon signal, a CDMA PN (pseudo random) sequence signal, a pilot signal or other broadcast signal. Synchronizer 1712 may evaluate the obtained broadcast information to determine timing information. By way of illustration, wireless terminal 1702 and the disparate wireless terminals 1720 may receive and synchronize to the same broadcast information, and therefore, have a common understanding of time. The common notion of time may be utilized to partition a timeline into distinct intervals for differing types of functions such as, for instance, peer discovery, paging, and traffic, according to a predetermined pattern defined by an air interface protocol. Moreover, the timing information may be utilized by the signal generator 1706 to create signals for transmission during peer discovery and/or peer analyzer 1708 to evaluate received signals for peer discovery. Furthermore, the synchronizer 1712 obtains and analyzes the common clock reference 1714 to coordinate performance of various functions (e.g., peer discovery, paging, traffic) and determine a meaningful notion of time (e.g., time counter) consistent with disparate wireless terminals 1720 in the peer-to-peer network. Therefore, peers get the same timing (timing synchronized) without directly communicating with each other.

The wireless terminal 1702 may be associated with a unique identifier (WT ID). For example, wireless terminal 1702 may include memory 1716 that retains a unique identifier (WT ID) that corresponds to wireless terminal 1702. However, it is contemplated that wireless terminal 1702 may derive, obtain, etc., its unique identifier (WT ID) from any location (e.g., local and/or remote to wireless terminal 1702). Additionally, memory 1716 may retain any additional type of data and/or instructions related to wireless terminal 1702. Moreover, wireless terminal 1702 may include a processor (not shown) that executes instructions described herein.

Signal generator 1706 may create and/or transmit a signal to the disparate wireless terminals 1720. Signal generator 1706 may encode and/or send a signal in a peer discovery interval as a function of the unique identifier (WT ID) of wireless terminal 1702. In accordance with an example, the signal yielded by signal generator 1706 may be a single-tone beacon signal, which may provide power efficiency. Thus, signal generator 1706 may effectuate transmitting a particular tone on a selected OFDM symbol within a peer discovery interval. It is contemplated that more than one beacon signal may be transmitted (e.g., in a plurality of OFDM symbols). For example, where the transmitted signal is a beacon signal, a selected symbol time position (e.g., within the peer discovery interval) and/or a tone position may be derived by a hash function of the unique identifier of wireless terminal 1702 (WT ID) and a time variable (e.g., timing information obtained by synchronizer 1712, time counter) identifying a current peer discovery interval. Further, wireless terminal 1702 and disparate wireless terminals 1720 may have a common value of the time variable (e.g., due to synchronization achieved by listening to an infrastructure communication channel available in a geographic area).

Pursuant to another example, the identifier associated with wireless terminal 1702 (WT ID) may be broadcast to peer(s) by signal generator 1706 (and/or peer discovery communicator 1704). Peer(s) obtaining the signal may detect and/or identify wireless terminal 1702. For example, the signal yielded by signal generator 1706 may be an output of an M-bit hash function whose input is the plain-text name of wireless terminal 1702 (e.g., WT ID) and a current counter value supplied by a base station broadcast signal (e.g., common clock reference). The counter value, for instance, may be constant during a current peer discovery interval and may be decodab1cby all peers. The counter value may vary (e.g., increment in a modulo sense) from one peer discovery interval to another. Further, the hash function may be specified a priori by a protocol and known to the peers.

By way of example, wireless terminal 1702 may be located in a peer-to-peer network that includes disparate wireless terminal WT A, WT B and WT n 1720. Synchronizer 1712 may determine timing associated with peer-to-peer communications (e.g., based upon a received common clock reference). Further, at a time partitioned for peer discovery, signal generator 1706 may broadcast a signal (e.g., generated based upon an identifier (CID) of the originating wireless terminal 1702 and/or a current time) to disparate wireless terminals within range (e.g., disparate wireless terminals 1720). The signal may be received and utilized by disparate wireless terminals 1720 to detect wireless terminal 1702 and/or determine an identity of wireless terminal 1702. Moreover, peer analyzer 1708 may obtain broadcast signals from disparate wireless terminals 1720. Peer analyzer 1708 may evaluate the obtained signals to detect disparate wireless terminals 1720 and/or identify disparate wireless terminals 1720.

Peer discovery effectuated by peer discovery communicator 1704 may be passive. Further, peer discovery may be symmetric; thus, wireless terminal 202 may detect and identify disparate wireless terminals WT A, WT B, and WT n 1720, and these disparate wireless terminals 1720 may detect and identify wireless terminal 1702. However, it is contemplated that a first wireless terminal may detect and identify a second wireless terminal, but the second wireless terminal may fail to detect and identify the first wireless terminal. Additionally, upon detection and identification, further communication (e.g., paging, traffic) between wireless terminal 1702 and disparate wireless terminal(s) 1720 may, but need not, be effectuated.

Peer analyzer 1702 may maintain a list of disparate wireless terminals 1720 that are detected to be present in the current time. The list may include all disparate wireless terminals 1720 or may include those in a predefined buddy list of wireless terminal 1702 or the user who is using wireless terminal 1702. As the time goes by, the list evolves, because some disparate wireless terminals 1720 may disappear (e.g., because the corresponding users move away), or because other disparate wireless terminals 1720 may appear (e.g., because the corresponding users move close). Peer analyzer 1708 may add the new disparate wireless terminals 1720 to the list or delete disappearing disparate wireless terminals 1720 from the list. In one embodiment, peer analyzer 1708 passively maintains the list. In this case, a first peer may detect the presence of a second peer and keep the second peer in its list without informing the second peer. As a result, the second peer may not know that the first peer has already kept the second peer in the list. By symmetry, depending on wireless channel and interference condition, the second peer may also detect the presence of the first peer and keep the first peer in its list without informing the first peer. In another embodiment, after the first peer detects the presence of the second peer, the first peer proactively sends a signal to inform the second peer so that the second peer now knows that the first peer has already kept the second peer in the list, even though the first peer has no data traffic to communicate with the second peer yet. The first peer may selectively decide whether it sends a signal. For example, the first peer may send a signal only to another peer that is in the predefined buddy list.

Additionally, the wireless terminal 1702 and components therein may be configured to perform one or more of the features illustrated in FIGS. 1-16.

Figure 18:
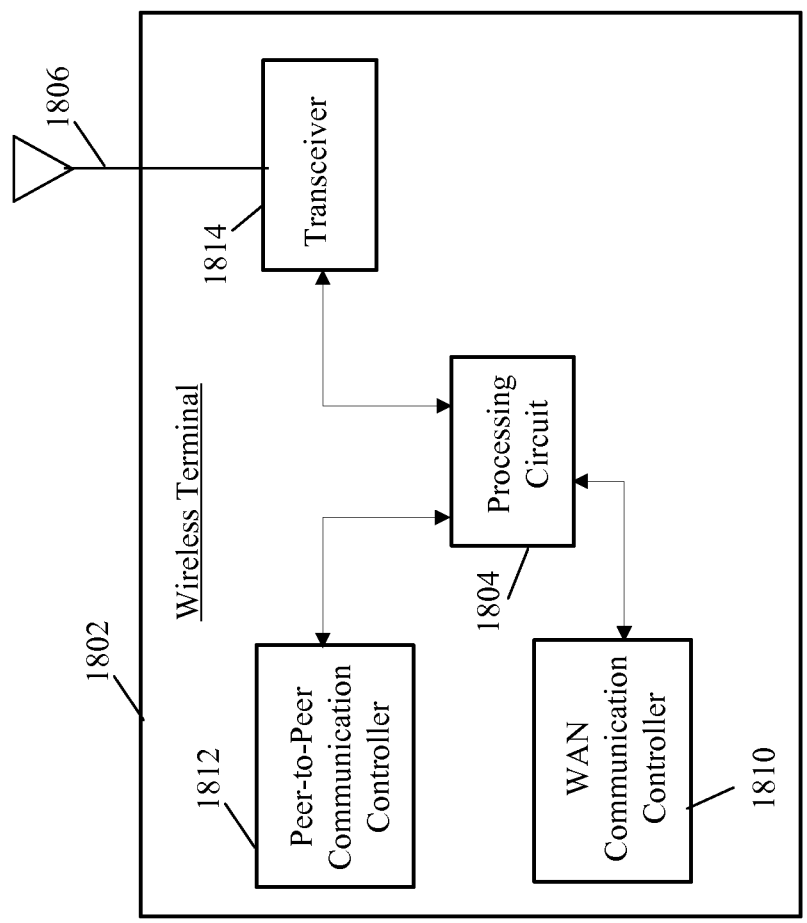
FIG. 18 is a block diagram of another embodiment of a wireless terminal that may be configured to perform orthogonal transmission CID selection in a peer-to-peer network.

FIG. 18 is a block diagram of another embodiment of a wireless terminal that may be configured to perform orthogonal transmission CID selection in a peer-to-peer network. The wireless terminal 1802 may include a processing circuit (e.g., one or more circuits or processors), a peer-to-peer communication controller 1812, a wide area network (WAN) controller 1810 and a transceiver 1814 coupled to an antenna 1806. The transceiver 1814 may include a (wireless) transmitter and a (wireless) receiver. The wireless terminal 1802 may communicate via a managed network infrastructure using the WAN communication controller 1810 and/or it may communicate over a peer-to-peer network using the peer-to-peer communication controller 1812. When performing peer-to-peer communications, the wireless terminal 1802 may be configured to perform one or more of the features illustrated in FIGS. 1-16.

It will be appreciated that, in accordance with one or more aspects described herein, inferences can be made regarding discovering and identifying peers in a peer-to-peer environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to identifying sources of peer discovery signals in a peer-to-peer network. In accordance with another example, an inference may be made related to estimating a probability of a peer being located within proximity based upon a number of detected signals that match an expected signal format and/or energy levels associated with detected signals. It will be appreciated that the foregoing examples are illustrative in nature and are not intended to limit the number of inferences that can be made or the manner in which such inferences are made in conjunction with the various embodiments and/or methods described herein.

One or more of the components, steps, and/or functions illustrated in FIGS. 1, 2, 3, 4, 5, 6, 7, 8, 9, 10, 11, 12, 13, 14, 15, 16, 17 and/or 18 may be rearranged and/or combined into a single component, step, or function or embodied in several components, steps, or functions. Additional elements, components, steps, and/or functions may also be added. The apparatus, devices, and/or components illustrated in FIGS. 1, 3, 17 and/or 18 may be configured or adapted to perform one or more of the methods, features, or steps described in FIGS. 2, and/or 4-16. The algorithms described herein may be efficiently implemented in software and/or embedded hardware.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the secondary microphone cover detector may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method of operating a first device, comprising:
sending, in a connection identifier broadcast channel, a first connection identifier broadcast signal corresponding to a connection identifier for a peer-to-peer communication connection between a pair of devices, said pair of devices including the first device and a second device;
monitoring the connection identifier broadcast channel to determine whether a second connection identifier broadcast signal corresponding to the connection identifier for said peer-to-peer communication connection is received from the second device; and
determining the second device is absent if it is determined that the second connection identifier broadcast signal is not received.

2. The method of claim 1, further comprising:
dropping the connection with the second device; and
restraining from sending connection identifier broadcast signals corresponding to the connection identifier in the connection identifier broadcast channel.

3. The method of claim 1, wherein the connection identifier broadcast channel is part of a frequency spectrum shared with a plurality of other peer-to-peer connections.

4. The method of claim 1, further comprising:
broadcasting, prior to establishing said peer-to-peer connection between the first device and the second device, a device identifier signal identifying said first device.

5. The method of claim 4,
wherein broadcasting a device identifier signal includes generating said device identifier signal from a unique device identifier corresponding to said first wireless device; and
wherein said broadcasting of the device identifier signal is performed in a peer discovery time interval.

6. The method of claim 4, further comprising:
selecting said connection identifier for said peer-to-peer communication connection from a set of connection identifiers, as part of initiating communication with said second wireless terminal.

7. The method of claim 6,
wherein said selecting said connection identifier for said peer-to-peer connection is performed prior to sending the connection identifier broadcast signal; and
wherein said connection identifier for said peer-to-peer connection is a connection identifier which is not used in the neighborhood in which the first wireless terminal is located at the time of said selection.

8. A method of operating a first device, comprising:
selecting a first one of a plurality of symbols in a time interval of a connection identifier broadcast channel to send a first connection identifier broadcast signal;
selecting a second one of the plurality of symbols to receive a second connection identifier broadcast signal;
sending the first connection identifier broadcast signal corresponding to a connection identifier in the connection identifier broadcast channel,
monitoring the connection identifier broadcast channel to determine whether the second connection identifier broadcast signal corresponding to the connection identifier is received from a second device; and
determining that the second device is absent if it is determined that the second connection identifier broadcast signal is not received.

9. The method of claim 8, wherein the first and second selected symbols are selected as a function of the connection identifier.

10. The method of claim 8, wherein the selection of the first and second symbols is determined by the first and second devices.

11. The method of claim 8, wherein each of the plurality of symbols is an OFDM symbol including a plurality of tones, the first connection identifier broadcast signal is sent in one of the plurality of tones in the first selected symbol, and the second connection identifier broadcast signal is received in one of the plurality of tones in the second selected symbol.

12. The method of claim 11, wherein the combinations of selected OFDM symbols and tones of the first and the second connection identifier broadcast signals are determined as a function of the connection identifier, and different connection identifiers correspond to different combinations of selected OFDM symbols and tones.

13. The method of claim 11, wherein the first and the second selected OFDM symbols are at least one OFDM symbol apart.

14. The method of claim 13, wherein the connection identifier broadcast channel includes at least a first and a second predetermined subsets of OFDM symbols, the first selected OFDM symbol in which the first connection identifier broadcast signal is sent belongs to the first subset, and the second selected OFDM symbol in which the second connection identifier broadcast signal is received belongs to the second subset.

15. The method of claim 14, wherein the partition of the first and second subsets is independent of any connection identifier.

16. A first device in a wireless communications network, comprising;
a transmitter and receiver for establishing the wireless peer-to-peer communication connection; and
a processing circuit adapted to perform peer to peer communications through the transmitter and receiver over a peer-to-peer communication channel, the processing circuit configured to send, in a connection identifier broadcast channel, a first connection identifier broadcast signal corresponding to a connection identifier for a peer-to-peer communication connection between a pair of devices, said pair of devices including the first device and a second device;
monitor the connection identifier broadcast channel to determine whether a second connection identifier broadcast signal corresponding to the connection identifier for said peer-to-peer communication connection is received from the second device; and
determine the second device is absent if it is determined that the second connection identifier broadcast signal is not received.

17. The first device of claim 16, wherein the processing circuit is further adapted to:
dropping the connection with the second device; and
restraining from sending connection identifier broadcast signals corresponding to the connection identifier in the connection identifier broadcast channel.

18. A first device comprising:
a transmitter and receiver for establishing the wireless peer-to-peer communication connection; and
a processing circuit configured to:
select a first one of a plurality of symbols in a time interval of a connection identifier broadcast channel to send a first connection identifier broadcast signal;

select a second one of the plurality of symbols to receive a second connection identifier broadcast signal;

send the first connection identifier broadcast signal corresponding to a connection identifier in the connection identifier broadcast channel, monitor the connection identifier broadcast channel to determine whether the second connection identifier broadcast signal corresponding to the connection identifier is received from a second device; and determine that the second device is absent if it is determined that the second connection identifier broadcast signal is not received.

19. The first device of claim 18, wherein the first and second selected symbols are selected, as a function of the connection identifier.

20. The first device of claim 18, wherein the selection of the first and second symbols is determined by the first and second devices.

21. The first device of claim 18, wherein each of the plurality of symbols is an OFDM symbol including a plurality of tones, the first connection identifier broadcast signal is sent in one of the plurality of tones in the first selected symbol, and the second connection identifier broadcast signal is received in one of the plurality of tones in the second selected symbol.

22. The first device of claim 21, wherein the combinations of selected OFDM symbols and tones of the first and the second connection identifier broadcast signals are determined as a function of the connection identifier, and different connection identifiers correspond to different combinations of selected OFDM symbols and tones.

23. The first device of claim 21, aherein the first and the second selected OFDM symbols are at least one OFDM symbol apart.

24. The first device of claim 22, wherein the connection identifier broadcast channel includes at least a first and a second predetermined subsets of OFDM symbols, the first selected OFDM symbol in which the first connection identifier broadcast signal is sent belongs to the first subset, and the second selected OFDM symbol in which the second connection identifier broadcast signal is received belongs to the second subset.

25. The first device of claim 24, wherein the partition of the first and second subsets is independent of any connection identifier.

26. A first device in a wireless communications network, comprising:
means for sending in a connection identifier broadcast channel a first connection identifier broadcast signal corresponding to a connection identifier for a peer-to-peer communication connection between a pair of devices, said pair of devices including the first device and a second device;
means for monitoring the connection identifier broadcast channel to determine whether a second connection identifier broadcast signal corresponding to the connection identifier for said peer-to-peer communication connection is received from the second device; and
means for determining the second device is absent if it is determined that the second connection identifier broadcast signal is not received.

27. The first device of claim 26, further comprising:
means for dropping the connection with the second device; and
means for restraining from sending connection identifier broadcast signals corresponding to the connection identifier in the connection identifier broadcast channel.

28. A first device comprising:
means for selecting a first one of a plurality of symbols in a time interval of a connection identifier broadcast channel to send a first connection identifier broadcast signal;
means for selecting a second one of a plurality of symbols to receive the second connection identifier broadcast signal;
means for sending the first connection identifier broadcast signal corresponding to a connection identifier in the connection identifier broadcast channel,
means for monitoring the connection identifier broadcast channel to determine whether the second connection identifier broadcast signal corresponding to the connection identifier is received from a second device; and
means for determining that the second device is absent if it is determined that the second connection identifier broadcast signal is not received.

29. The first device of claim 28, wherein the first and second selected symbols are selected as a function of the connection identifier.

30. The first device of claim 28, wherein each of the plurality of symbols is an OFDM symbol including a plurality of tones, the first connection identifier broadcast signal is sent in one of the plurality of tones in the first selected symbol, and the second connection identifier broadcast signal is received in one of the plurality of tones in the second selected symbol.

31. The first device of claim 30, wherein the combinations of selected OFDM symbols and tones of the first and the second connection identifier broadcast signals are determined as a function of the connection identifier, and different connection identifiers correspond to different combinations of selected OFDM symbols and tones.

32. A circuit for use in a first device, the circuit being configured to:
send, in a connection identifier broadcast channel, a first connection identifier broadcast signal corresponding to a connection identifier for a peer-to-peer communication connection between a pair of devices, said pair of devices including the first device and a second device;
monitor the connection identifier broadcast channel to determine whether a second connection identifier broadcast signal corresponding to the connection identifier for said peer-to-peer communication connection is received from the second device; and
determine the second device is absent if it is determined that the second connection identifier broadcast signal is not received.

33. The circuit of claim 32, wherein the circuit is further adapted to:
drop the connection with the second device; and
restrain from sending connection identifier broadcast signals corresponding to the connection identifier in the connection identifier broadcast channel.

34. A circuit for use in a first device, the circuit being configured to:
select a first one of a plurality of symbols in a time interval of a connection identifier broadcast channel to send a first connection identifier broadcast signal;
select a second one of the plurality of symbols to receive a second connection identifier broadcast signal;
send the first connection identifier broadcast signal corresponding to a connection identifier in the connection identifier broadcast channel,
monitor the connection identifier broadcast channel to determine whether the second connection identifier broadcast signal corresponding to the connection identifier is received from a second device; and determine that the second device is absent if it is determined that the second connection identifier broadcast signal is not received.

35. The circuit of claim 34, wherein the first and second selected symbols are selected as a function of the connection identifier.

36. The circuit of claim 34, wherein each of the plurality of symbols is an OFDM symbol including a plurality of tones, the first connection identifier broadcast signal is sent in one of the plurality of tones in the first selected, symbol, and the second connection identifier broadcast signal is received in one of the plurality of tones in the second selected symbol.

37. The circuit of claim 36, wherein the combinations of selected OFDM symbols and tones of the first and the second connection identifier broadcast signals are determined as a function of the connection identifier, and different connection identifiers correspond to different combinations of selected OFDM symbols and tones.

38. A non-transitory machine-readable medium comprising instructions for a first device in a wireless communications network, which when executed by a processor causes the processor to:
send, in a connection identifier broadcast channel, a first connection identifier broadcast signal corresponding to a connection identifier for a peer-to-peer communication connection between a pair of devices said pair of devices including the first device and a second device;
monitor the connection identifier broadcast channel to determine whether a second connection identifier broadcast signal corresponding to the connection identifier for said peer-to-peer communication connection is received from the second device; and
determine the second device is absent if it is determined that the second connection identifier broadcast signal is not received.

39. The non-transitory machine-readable medium of claim 38, further comprising instructions to:
drop the connection with the second device; and
restrain from sending connection identifier broadcast signals corresponding to the connection identifier in the connection identifier broadcast channel.

40. A non-transitory machine-readable medium for use in a first device, the non-transitory machine-readable medium including instructions which when executed by a processor causes said processor to:
select a first one of a plurality of symbols in a time interval of a connection identifier broadcast channel to send a first connection identifier broadcast signal;
select a second one of the plurality of symbols to receive a second connection identifier broadcast signal;
send the first connection identifier broadcast signal corresponding to a connection identifier in the connection identifier broadcast channel,
monitor the connection identifier broadcast channel to determine whether the second connection identifier broadcast signal corresponding to the connection identifier is received from a second device; and
determine that the second device is absent if it is determined that the second connection identifier broadcast signal is not received.

41. The non-transitory machine-readable medium of claim 40, wherein the first and second selected symbols are selected as a function of the connection identifier.

42. The non-transitory machine-readable medium of claim 40, wherein each of the plurality of symbols is an OFDM symbol including a plurality of tones, the first connection identifier broadcast signal is sent in one of the plurality of tones in the first selected symbol, and the second connection identifier broadcast signal is received in one of the plurality of tones in the second selected symbol.

43. The non-transitory machine-readable medium of claim 42, wherein the combinations of selected OFDM symbols and tones of the first and the second connection identifier broadcast signals are determined as a function of the connection identifier, and different connection identifiers correspond to different combinations of selected OFDM symbols and tones.

\* \* \* \* \*